(12) United States Patent
Ikeuchi

(10) Patent No.: US 7,958,463 B2
(45) Date of Patent: Jun. 7, 2011

(54) COMPUTER AUTOMATED METHOD FOR MANUFACTURING AN INTEGRATED CIRCUIT PATTERN LAYOUT

(75) Inventor: Atsuhiko Ikeuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 175 days.

(21) Appl. No.: 12/242,832

(22) Filed: Sep. 30, 2008

(65) Prior Publication Data

US 2009/0064083 A1 Mar. 5, 2009

Related U.S. Application Data

(62) Division of application No. 11/263,845, filed on Oct. 31, 2005, now Pat. No. 7,451,429.

(30) Foreign Application Priority Data

Nov. 1, 2004 (JP) ................................ P2004-318427

(51) Int. Cl.
*G06F 17/50* (2006.01)
(52) U.S. Cl. ................ 716/54; 716/50; 716/51; 716/52; 716/53; 716/55; 430/5; 430/30
(58) Field of Classification Search ................ 716/8–11, 716/19–21, 50–55; 430/5, 30; 438/128–129
See application file for complete search history.

(56) References Cited

U.S. PATENT DOCUMENTS

| 6,539,519 | B1 * | 3/2003 | Meeker .......................... 716/102 |
| 6,553,558 | B2 * | 4/2003 | Palmer et al. .................... 716/19 |
| 6,631,307 | B1 | 10/2003 | Tzu et al. |
| 6,668,367 | B2 * | 12/2003 | Cobb et al. ...................... 716/19 |
| 6,952,818 | B2 | 10/2005 | Ikeuchi |
| 7,194,707 | B2 | 3/2007 | Kotani et al. |

FOREIGN PATENT DOCUMENTS

| JP | 08-137087 | 5/1996 |
| JP | 2000-187314 | 7/2000 |
| JP | 2003-162041 | 6/2003 |
| JP | 2003-257842 | 9/2003 |
| JP | 2004-302110 | 10/2004 |

OTHER PUBLICATIONS

Official Office Action Letter issued on Feb. 10, 2009, in Taiwan application No. 094137590, including Japanese language translation thereof.

* cited by examiner

*Primary Examiner* — Nghia M Doan
(74) *Attorney, Agent, or Firm* — DLA Piper LLP (US)

(57) ABSTRACT

A computer automated method for designing an integrated circuit includes placing a plurality of marks on each of contours of a plurality of patterns allocated in a chip area; dividing the marks into a plurality of groups so that the adjacent marks are merged in a same group; determining one of the groups as a candidate hot spot based on a total number of marks included in each of the groups; and modifying the corresponding pattern in the candidate hot spot.

20 Claims, 41 Drawing Sheets

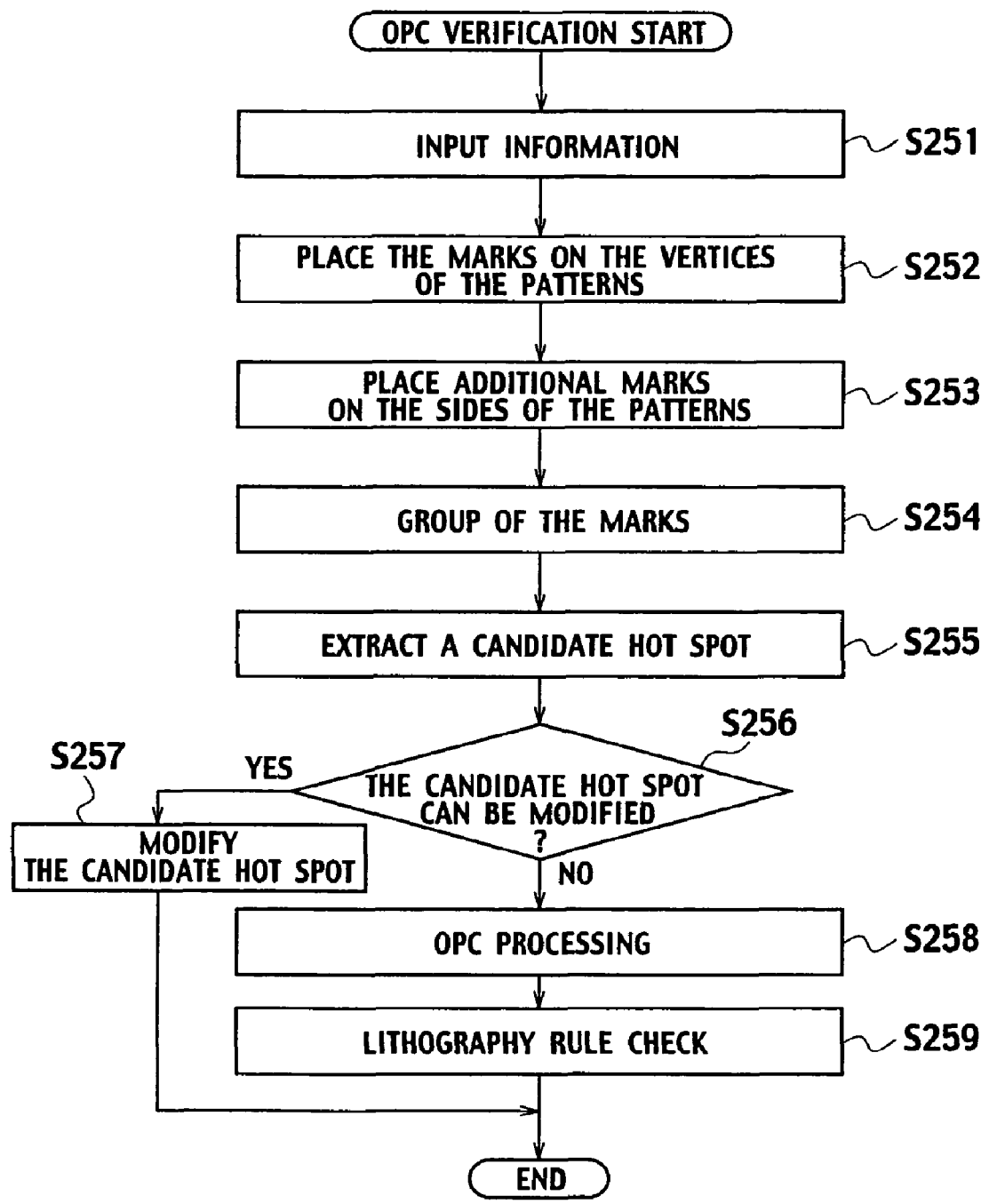

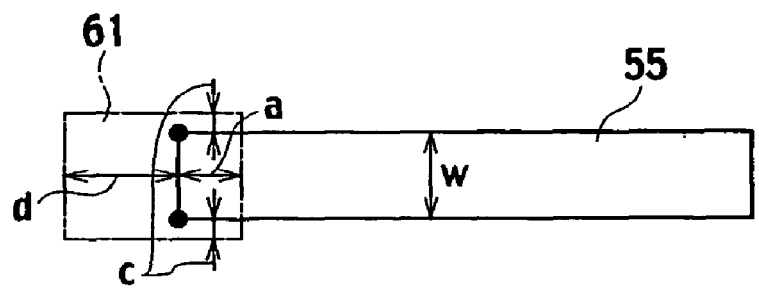
FIG. 16A   LINE END
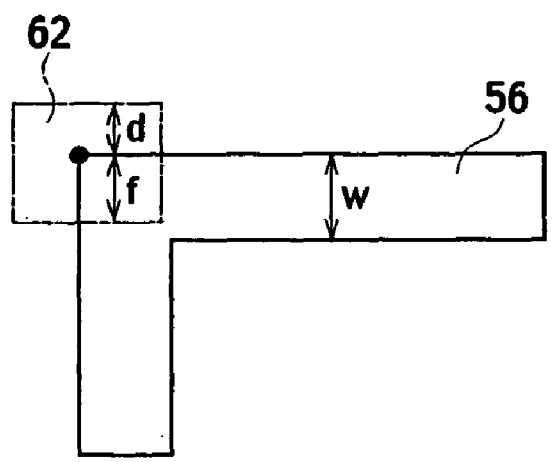
FIG. 16B   OUTER CORNER
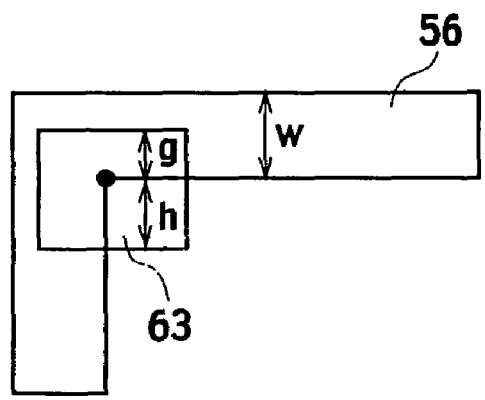
FIG. 16C   INNER CORNER
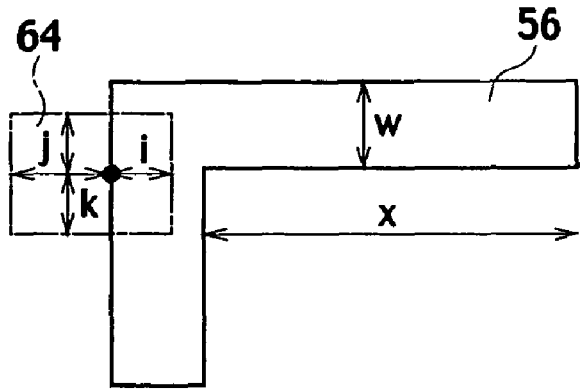
FIG. 16D   ADDITIONAL MARK

FIG. 17

| MARK CATEGORIES / NUMBER OF CLOSED PLANE FIGURES IN A GROUP | THE TOTAL NUMBER OF MARKS (INCLUDING ADDITIONAL MARKS) | NUMBER OF THE ADDITIONAL MARK | |
|---|---|---|---|
| | | ADDITIONAL MARK 1 | ADDITIONAL MARK 2 |
| ONE CLOSED PLANE FIGURE | SEVEN OR MORE | 0 | 0 |
| MORE THAN TWO CLOSED PLANE PATTERNS | FOUR | 0 | TWO |
| | FIVE OR MORE | 0 | 0 |

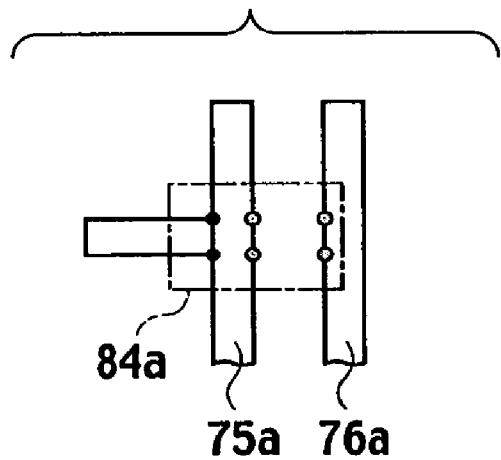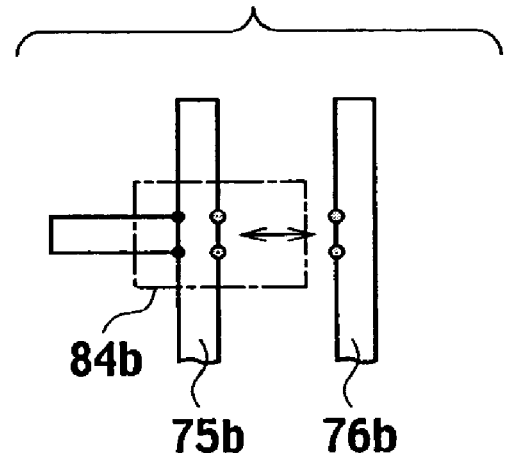

NO CANDIDATE OPC HOT SPOT

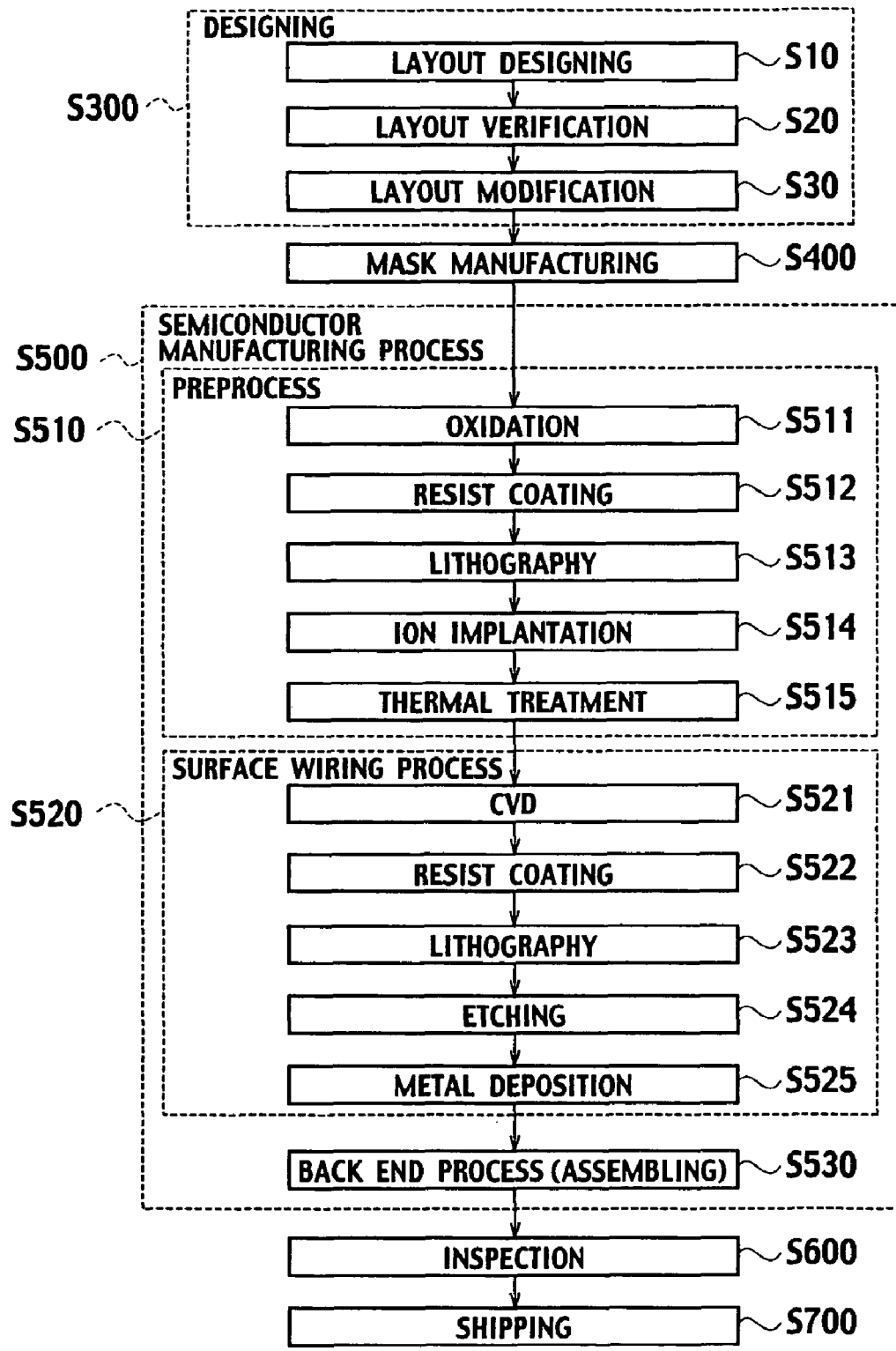

| DISTANCE d (μm) | CORRECTION VALUE ℓ (μm) |
|---|---|
| d < 0.3 | 0.025 |
| 0.3 ≦ d < 0.4 | 0.045 |
| 0.4 ≦ d < 0.6 | 0.055 |
| 0.6 < d | 0.060 |

AREA

CANDIDATE OPC HOT SPOT

COMPUTER AUTOMATED METHOD FOR MANUFACTURING AN INTEGRATED CIRCUIT PATTERN LAYOUT

CROSS REFERENCE TO RELATED APPLICATIONS AND INCORPORATION BY REFERENCE

This is a division of patent application Ser. No. 11/263,845, filed Oct. 31, 2005, published as US 2006/0123380 A1, now U.S. Pat. No. 7,451,429, which is based upon and claims the benefit of priority from the prior Japanese Patent Application No. P2004-318427, filed on Nov. 1, 2004; the entire contents of all of which are incorporated herein by reference.

BACKGROUND OF THE INVENTION

1. Field of the Invention

The present invention relates to an integrated circuit, more specifically to a computer automated method for designing an integrated circuit, a computer automated system for designing an integrated circuit, and an integrated circuit designed by the computer automated method and system.

2. Description of the Related Art

In manufacturing processes of semiconductor integrated circuits, it has become increasingly important to provide measures to counter random defects caused by adhesion of dust because of miniaturization in recent years. In the layout design process of semiconductor integrated circuits, various measures have been implemented. As the measures in the layout design process, (a) insertion of multiple vias and contacts, (b) spreading wires, (c) increasing wire width, (d) designing a fault tolerant circuit, and the like are effective.

On the other hand, the requirements for miniaturization in recent years have made it difficult to form desired patterns on a wafer even using an accurate mask. To improve design fidelity, technologies called optical proximity correction (OPC) and process proximity correction (PPC) are widely used. The OPC and PPC form a mask pattern to form a pattern on a wafer as designed. Hereinafter, the OPC and PPC are generally referred to as OPC.

Verification of the design fidelity is also important as a measure for systematic defects generated due to each process of the manufacturing process. The systematic defects are generated in a lithography process, an etching process. In a case where a half pitch of design patterns is less than 140 nm, some regions are not sufficiently subjected to the OPC process depending on the design patterns even when a predetermined design rule is followed. The correction by the OPC process is therefore not properly performed, and problems with the wafer shape occur, thus increasing problems reducing the yield (hereinafter, referred to as OPC problems). A measure to correct the OPC problems is a check (hereinafter, referred to as lithography rule check) based on a lithography simulation. In the lithography rule check, the lithography simulation is performed for patterns after OPC. The obtained patterns and the respective design patterns are then compared to detect a portion which could be a device problem. Contents of an error are an error type (open, short, and shortening errors and the like), an error level, and the like. The error level is a fatal error with a problem known (hereinafter, referred to as just a fatal error), the OPC problem (gray zone error) which is not fatal but does not have an enough margin for process variation, or the like.

In small-scale cell design, the lithography rule check in design is performed with these cells arbitrarily arranged. Accordingly, the layout can be modified in advance when the layout includes a pattern where the OPC problem could occur.

On the other hand, in chip or macroblock level design, automatic placement and routing tools and the like are widely used. This can implement a layout dominantly composed of wiring patterns extending in one direction. Accordingly, there are a few variations on the wiring patterns, and the probability of occurrence of the OPC problems is not high.

However, when a design for the yield improvement by the random defect measure, a crosstalk measure, and the like fully begin to be carried out in designing chip and macroblock level comparatively large-scale semiconductor integrated circuits, the following problems occur.

(a) Variations of wire patterns increase, and the probability of occurrence of the OPC problems increases.

(b) Because of the increase in the probability of occurrence of the OPC problems, the lithography rule check becomes necessary. The wire patterns occupy a large area, and the lithography rule check requires a large amount of computer resources and processing time. The verification is therefore difficult to perform for a practical period of time.

(c) In the lithography rule check, many gray zone errors are detected. To improve the yield, measures for the gray zone errors are also important. The gray zone errors are detected more than the fatal errors, and measures thereof are complicated. Accordingly, when many errors are detected, it is more difficult to address all the detected errors for the practical period of time.

SUMMARY OF THE INVENTION

An aspect of the present invention inheres in a computer automated method for designing an integrated circuit encompassing placing a plurality of marks on each of contours of a plurality of patterns allocated in a chip area; dividing the marks into a plurality of groups so that the adjacent marks are merged in a same group; determining one of the groups as a candidate hot spot based on a total number of marks included in each of the groups; and modifying the corresponding pattern in the candidate hot spot.

Another aspect of the present invention inheres in a computer automated system for designing an integrated circuit encompassing a mark module configured to place a plurality of marks on each of contours of a plurality of patterns allocated in a chip area; a grouping module configured to divide the marks into a plurality of groups so that adjacent marks are merged in a same group; a candidate hot spot judgment module configured to judge one of the groups as a candidate hot spot based on a total number of marks included in each of the groups; and a modification module configured to modify corresponding pattern in the candidate hot spot.

Still another aspect of the present invention inheres in a method of manufacturing an integrated circuit encompassing designing layout information including patterns of cells, wires, and vias to be placed on a semiconductor substrate implemented in a graphic image space; verifying the layout information by placing a plurality of marks on contours of the patterns, dividing the marks into a plurality of groups so that the adjacent marks are merged in a same group, determining one of the groups as a candidate hot spot according to a total number of marks included in each of the groups, and modifying the layout based on a judged result in the graphic image space; modifying the layout information by executing a lithography rule check; producing a plurality of masks based on modified layout information; forming an insulating film on the semiconductor substrate; selectively etching a part of the insulating film by using one of the masks; and forming corresponding actual vias and corresponding actual wires connected to the actual vias in the insulating film.

BRIEF DESCRIPTION OF DRAWINGS

FIG. 15 is a flowchart illustrating an OPC verification method according to the first embodiment of the present invention;

FIG. 16A is a schematic diagram illustrating OPC verification information used in the OPC verification method according to the first embodiment of the present invention;

FIG. 16B is a schematic diagram illustrating OPC verification information used in the OPC verification method according to the first embodiment of the present invention;

FIG. 16C is a schematic diagram illustrating OPC verification information used in the OPC verification method according to the first embodiment of the present invention;

FIG. 16D is a schematic diagram illustrating OPC verification information used in the OPC verification method according to the first embodiment of the present invention;

FIG. 17 is an example of a list of the OPC hot spot judgment information used in the OPC verification method according to the first embodiment of the present invention;

FIG. 21A is an example of pattern geometry before the OPC hot spot correction has been executed according to the first embodiment of the present invention;

FIG. 21B is an example of pattern geometry after the OPC hot spot correction has been executed according to the first embodiment of the present invention;

FIG. 32 is a flowchart illustrating a method of manufacturing a semiconductor device according to the first embodiment of the present invention;

DETAILED DESCRIPTION OF THE INVENTION

Figure 1:
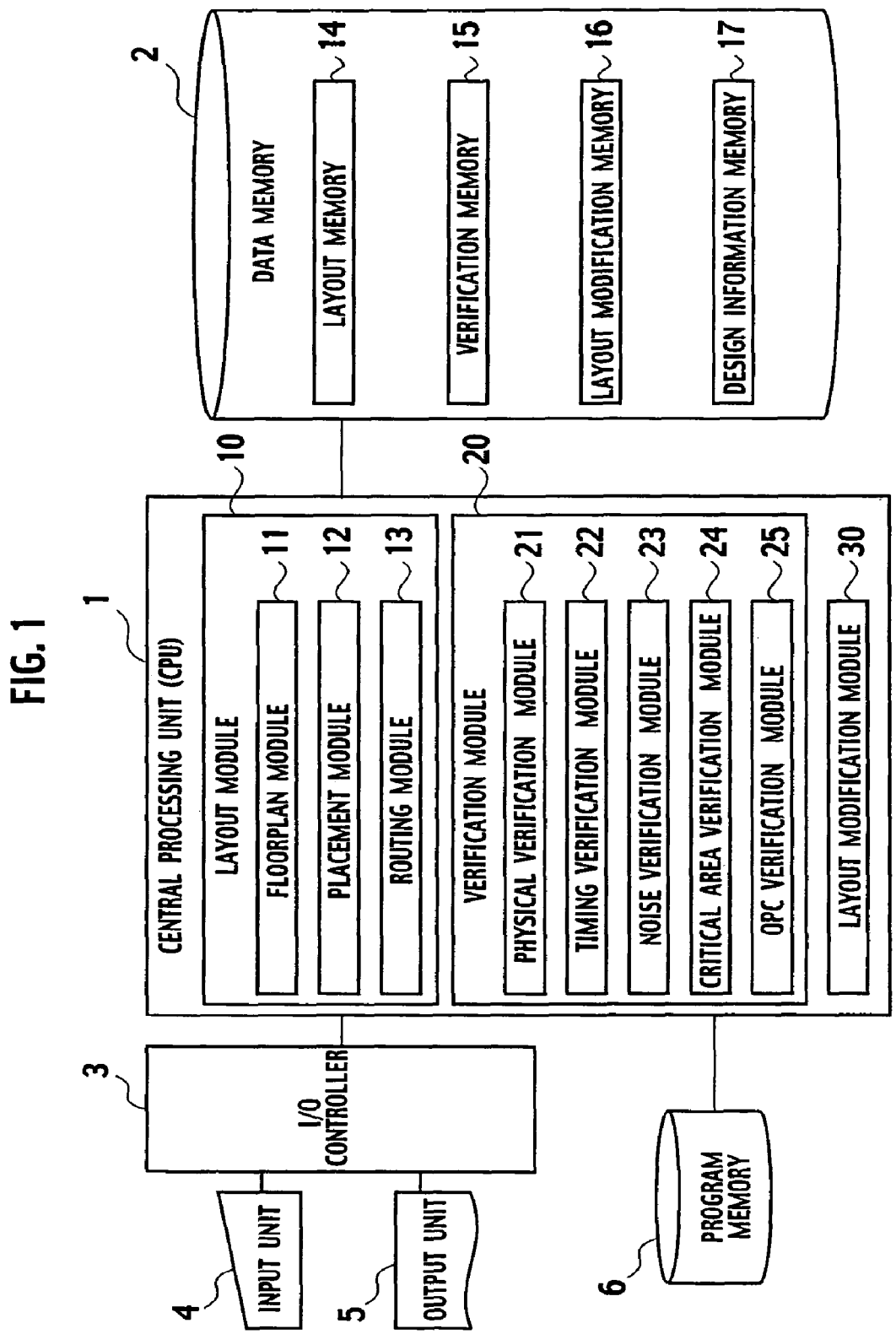
FIG. 1 is a block diagram illustrating a computer automated system for designing an integrated circuit according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified. In the following descriptions, numerous details are set forth such as specific signal values, etc. to provide a thorough understanding of the present invention. However, it will be obvious to those skilled in the art that the present invention may be practiced without such specific details.

First Embodiment

—Computer Automated System—

As shown in FIG. 1, a computer automated system for designing an integrated circuit according to the embodiment of the present invention includes an input unit 4 which inputs information such as data or instructions from an operator, a central processing unit (CPU) 1, which executes various arithmetic operations for a layout design and the like, an output unit 5 which outputs a layout result and the like, a data memory 2 which stores design information necessary for the layout design of the semiconductor integrated circuit, and a program memory 6 which stores a layout program of the semiconductor integrated circuit, and the like. The input unit 4 and the output unit 5 is connected to the CPU 1 through an input and output controller 3.

The CPU 1 includes a layout module 10 to place cells, wires, vias, and the like in a chip area, a verification module 20 to verify a result of the layout designed by the layout module 10, and a layout modification module 30 to modify the layout based on a result of the verification of the layout. The layout module 10 includes a floorplan module 11 to create a floorplan of the semiconductor integrated circuit, a placement module 12 to place cells in the chip area, and a routing module 13 to route wires and connect wires with vias and contacts in the chip area.

The verification module 20 includes a physical verification module 21, a timing verification module 22, a noise verification module 23, a critical area verification module 24, and an OPC verification module 25. The physical verification module 21 verifies the layout of each pattern of wires, and vias placed in the chip area using software such as design rule check (DRC) and Layout vs. Schematic (LVS). The timing verification module 22 verifies timing and crosstalk of cells, power lines, clock lines, signal lines in the chip area. The noise verification module 23 verifies noise generated from a layout chip, verification regarding power supply, and the like. The critical area verification module 24 verifies critical areas which are problematic in the manufacturing process, including short, open, and shortening points of wires and vias. The OPC verification module 25 verifies the OPC problems caused in the layout including wires, vias placed in the chip area.

Figure 2:
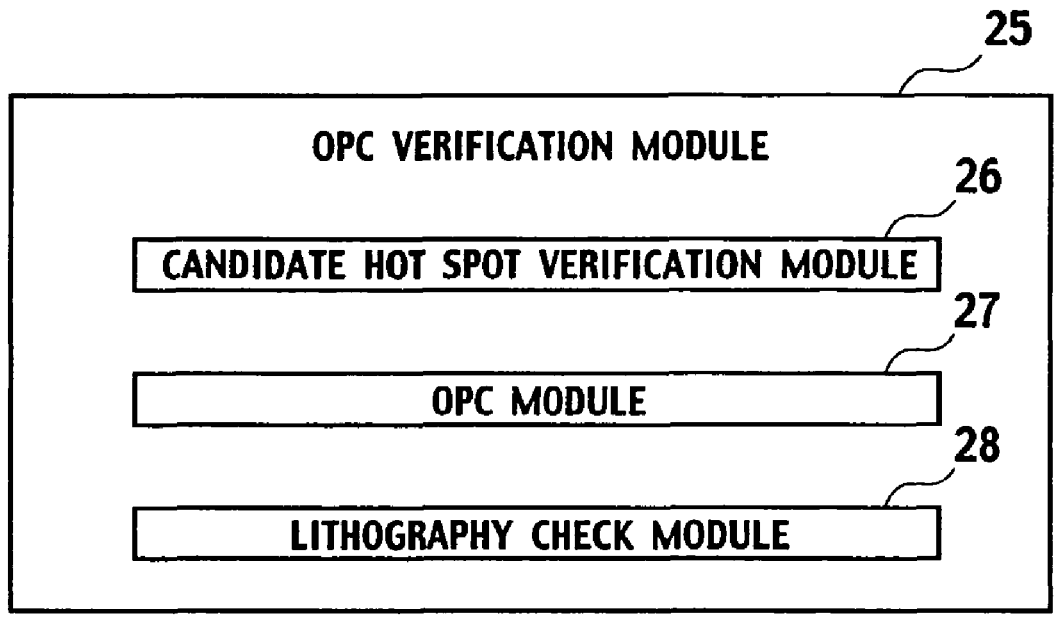
FIG. 2 is a block diagram illustrating an OPC verification module according to the first embodiment of the present invention.

As shown in FIG. 2, the OPC verification module 25 includes a candidate hot spot verification module 26, an OPC module 27, and a lithography check module 28. The candidate hot spot verification module 26 detects to verify an area which could be a candidate for the OPC problem (hereinafter, referred to as a candidate OPC hot spot). The OPC module 27 processes the OPC for each pattern in the layout. The lithography check module 28 checks the lithography rule for each pattern in the layout whether or not actual OPC hot spot is generated after the OPC.

Figure 3:
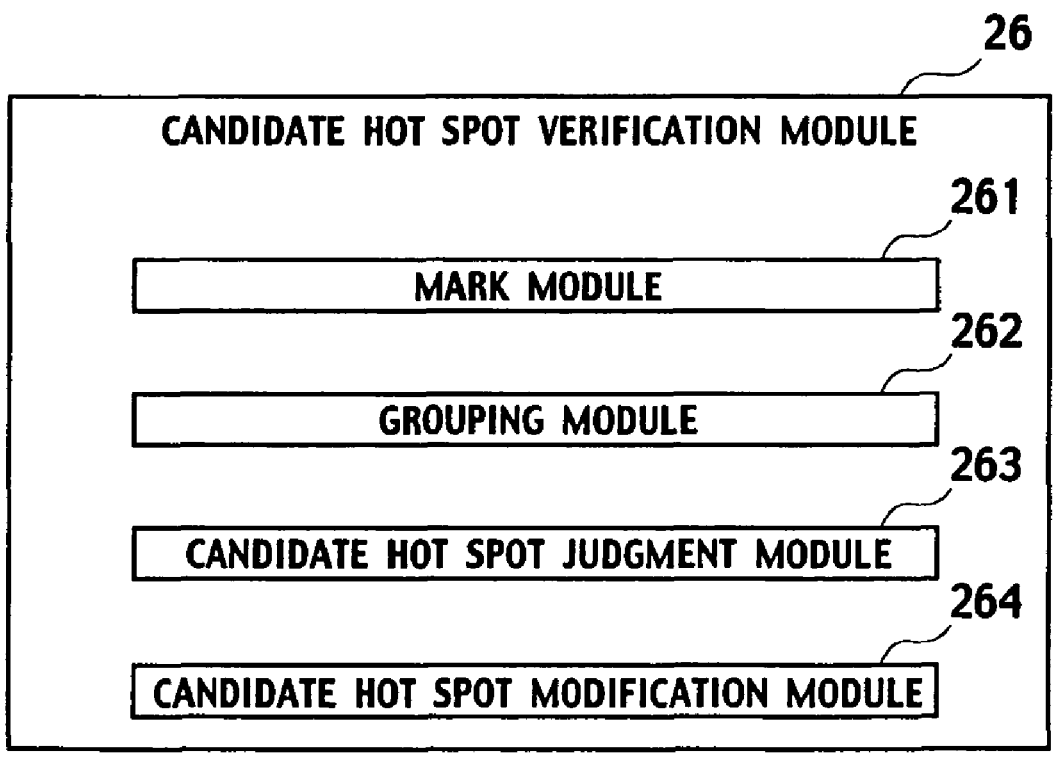
FIG. 3 is a block diagram illustrating a hot spot verification module of FIG. 2 according to the first embodiment of the present invention.
Figure 4:
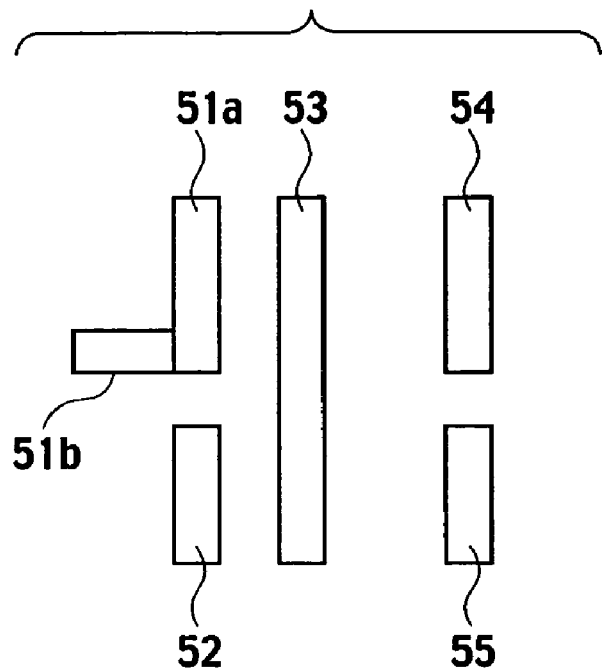
FIG. 4 is a layout example illustrating a method of extracting an OPC hot spot of an OPC verification method according to the first embodiment of the present invention.
Figure 5:
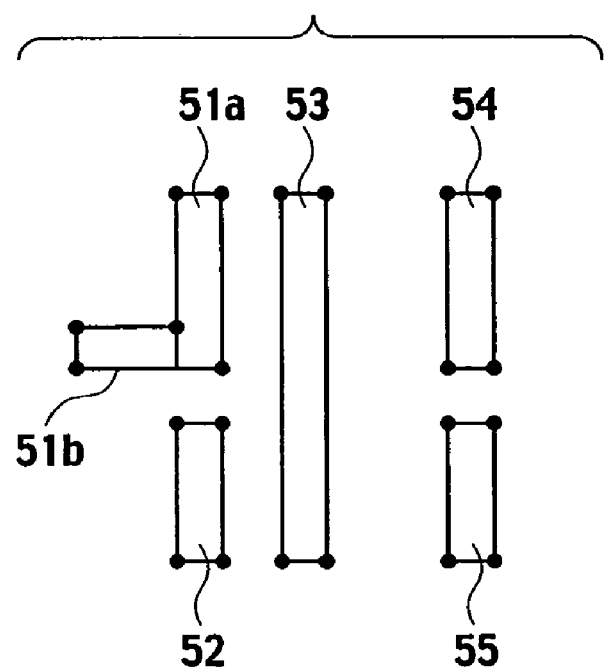
FIG. 5 is a layout example illustrating the method of extracting the OPC hot spot of the OPC verification method according to the first embodiment of the present invention.

As shown in FIG. 3, the candidate hot, spot verification module 26 includes a mark module 261, a grouping module 262, a candidate hot spot judgment module 263, and a candidate hot spot modification module 264. The mark module 261 places a plurality of marks on contours of closed plane figures forming patterns 51a, 51b, 52, 53, 54, and 55 placed in the chip area as shown in FIG. 4. For example, as shown in FIG. 5, the mark module 261 places marks at vertices of the patterns 51a, 51b, 52, 53, 54, and 55. When additional marks placed at positions other than the vertices are necessary for higher accuracy in extracting the candidate OPC hot spots, the mark module 261 places the additional marks on sides of the patterns 51a, 51b, 52, 53, 54, and 55 based on additional mark information previously stored in the data memory 2.

Figure 6:
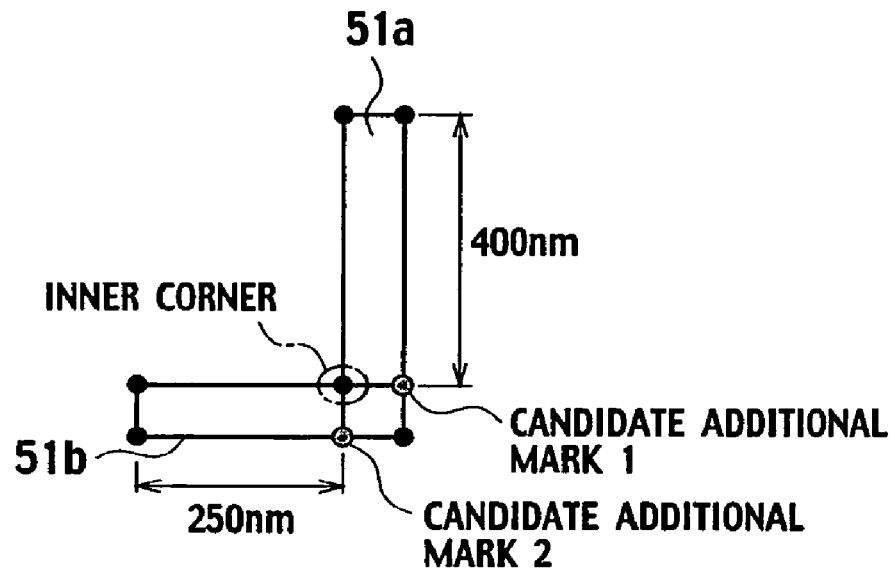
FIG. 6 is a layout example illustrating the method of extracting the OPC hot spot of the OPC verification method according to the first embodiment of the present invention.
Figure 7:
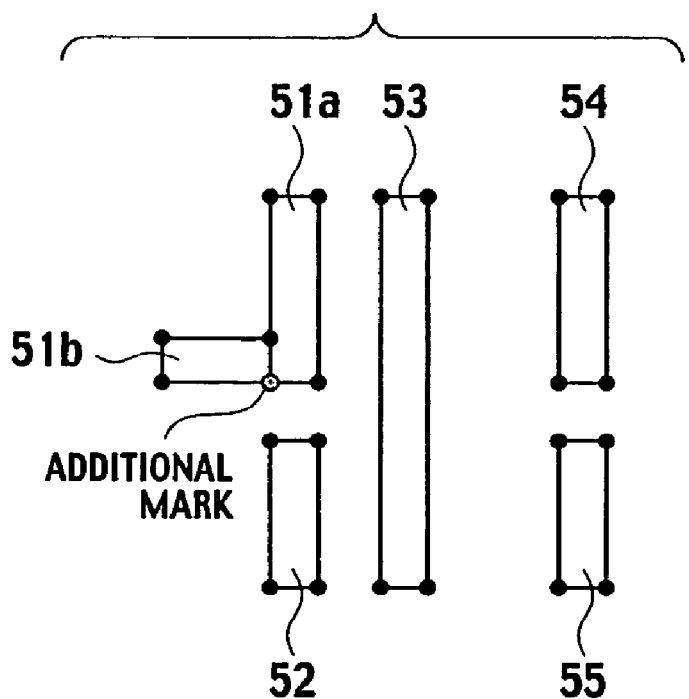
FIG. 7 is a layout example illustrating the method of extracting the OPC hot spot of the OPC verification method according to the first embodiment of the present invention.

Examples of the placement of the additional marks are shown in FIGS. 6 and 7. For example, as shown in FIG. 6, the OPC problems are likely to occur around an inner corner which is formed at an intersection of the patterns 51a and 51b. The mark module 261 then temporarily places a candidate additional mark 1 at a point of an edge of the pattern 51a located on an extension of an edge of the pattern 51b passing through the inner corner and temporarily places a candidate additional mark 2 at a point of an edge of the pattern 51b located on an extension of an edge of the pattern 51a passing through the inner corner.

The mark module 261 reads additional mark restriction information stored in the data memory 2 and determines an additional mark finally placed on the patterns 51a and 51b out of the candidate additional marks 1 and 2. For example, it is assumed that a condition in the additional mark restriction information is set to "when length between a vertex and the inner corner of a pattern is not less than 400 nm, an additional mark is placed at a point of an edge of the other pattern on an extension of the pattern passing through the inner corner". Based on the additional mark restriction information, the mark module 261 determines the additional mark finally placed to be the candidate additional mark 2 because the length between the vertex of the pattern 51a and the inner corner is 400 nm. As shown in FIG. 7, the mark module 261 places the additional mark at a point of an edge on the pattern 51b located on the extension of the edge of the pattern 51a passing through the inner corner.

Figure 8:
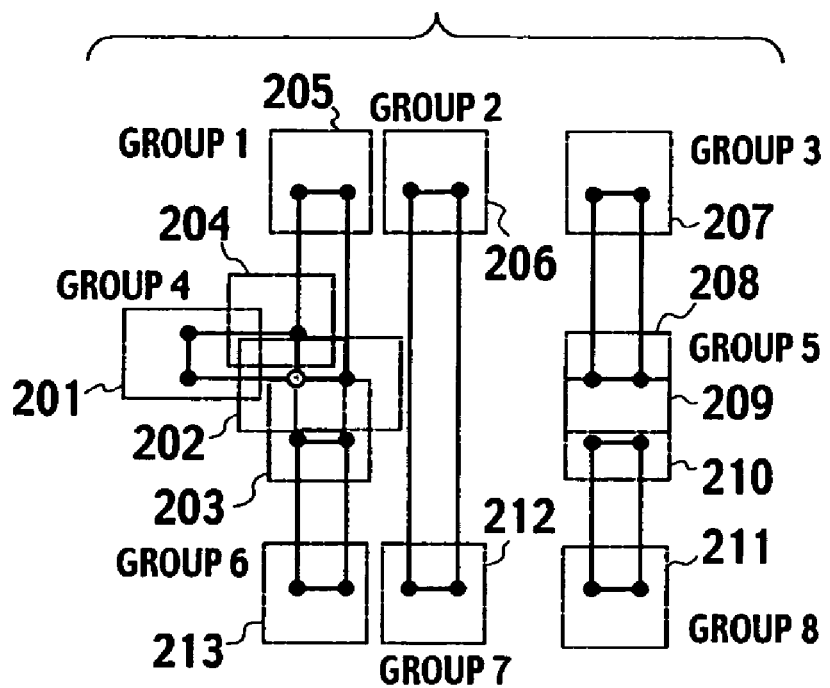
FIG. 8 is a layout example illustrating the method of extracting the OPC hot spot of the OPC verification method according to the first embodiment of the present invention.
Figure 9:
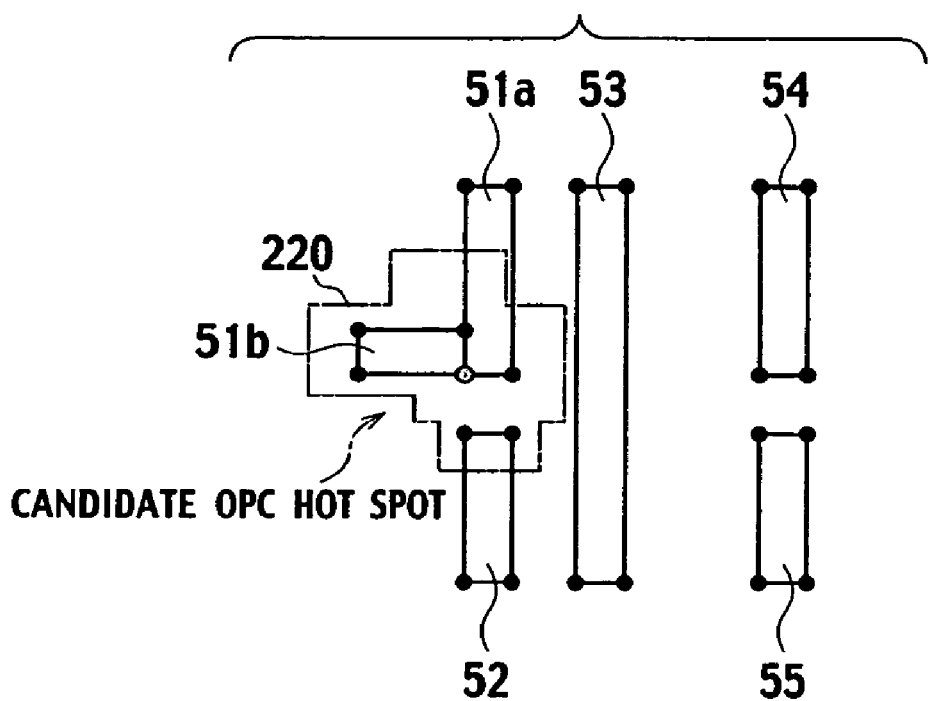
FIG. 9 is a layout example illustrating the method of extracting the OPC hot spot of the OPC verification method according to the first embodiment of the present invention.

The grouping module 262 reads area information stored in the data memory 2 and allocates a plurality of areas 201, 202, 203, 204, 205, 206, 207, 208, 209, 210, 211, 212, and 213 on the marks given to the individual vertices and additional mark as shown in FIG. 8. Herein, the "areas" 201-213 are patterns, which are strongly affected by the OPC, and are allocated around the marks and the additional marks placed by the mark module 261. As shown in FIGS. 8 and 9, the grouping module 262 merges overlapping areas 201-204 into a single polygon 220 of a group 4. The grouping module 262 also merges the area 205 to a group 1, the area 206 to a group 2, the area 207 to a group 3, overlapping areas 208-210 to a group 5, the area 213 to a group 6, the area 212 to a group 7, and the area 211 to a group 8.

The candidate hot spot judgment module 263 reads candidate hot spot judgment information stored in the data memory 2 and judges the candidate OPC hot spot on the patterns included in the layout based on the number of marks included in each group. For example, when the hot spot judgment information is previously set to "a group including seven or more marks is extracted as the candidate OPC hot spot", the candidate hot spot judgment module 263 extracts the group 4 on the patterns 51a, 51b, and 52 as the candidate OPC hot spot as shown in FIG. 9.

Figure 10:
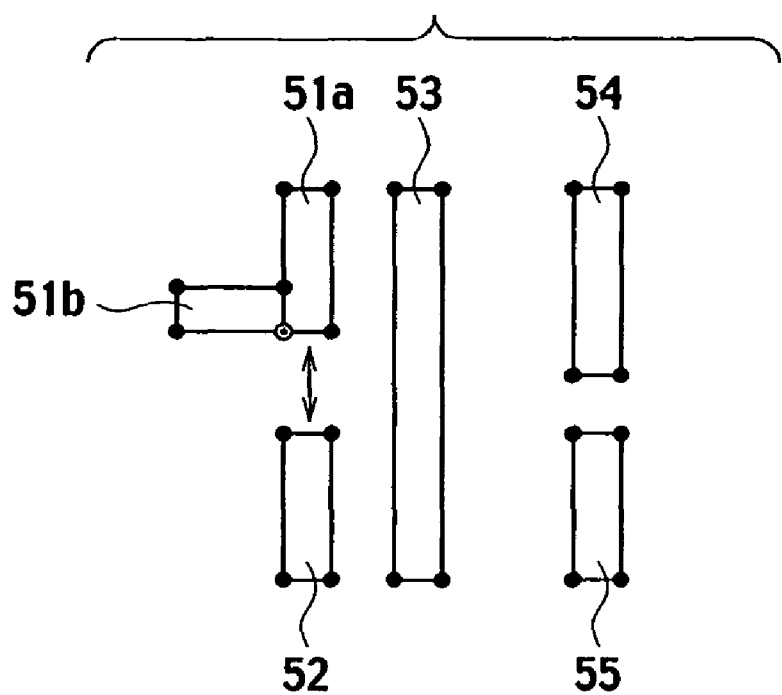
FIG. 10 is a layout example illustrating a comparative example of the results of the lithography rule check according to the first embodiment of the present invention.

The candidate hot spot modification module 264 modifies the layout of the patterns 51a, 51b, and 52 based on candidate hot spot modification information stored in the data memory 2 so that the number of marks in the group judged as the candidate OPC hot spot is reduced. The "modifying the layout so that the number of marks in the group judged as the candidate OPC hot spot" indicates, for example, as shown in FIG. 10, that the candidate hot spot modification module 264 increases the distance between the patterns 51a and 52 for correction such that the marks of the pattern 52 are not included in the group 4.

Figure 11:
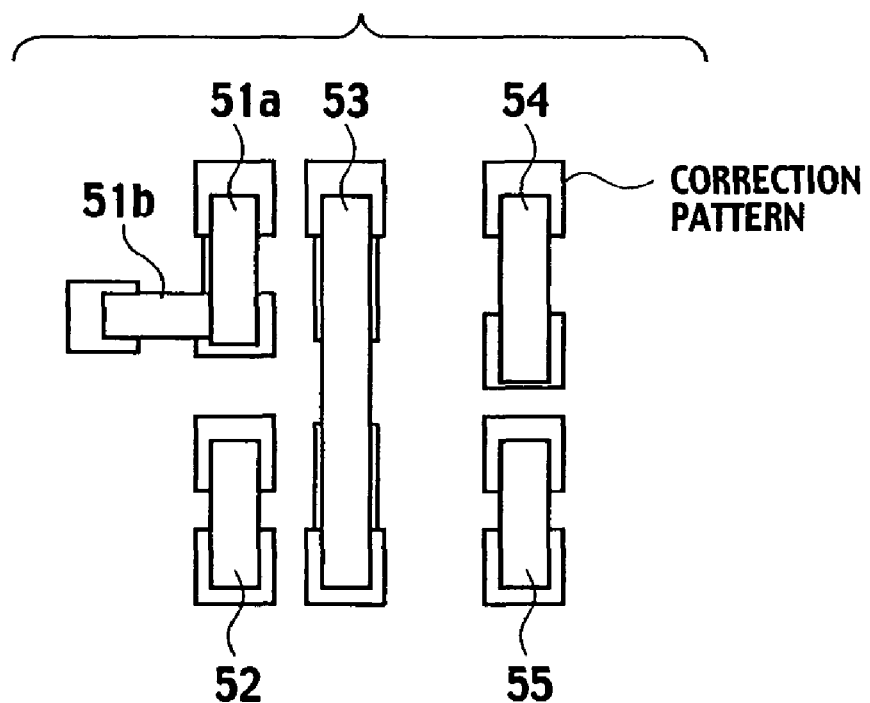
FIG. 11 is a layout example illustrating a comparative example of the results of the lithography rule check according to the first embodiment of the present invention.
Figure 12:
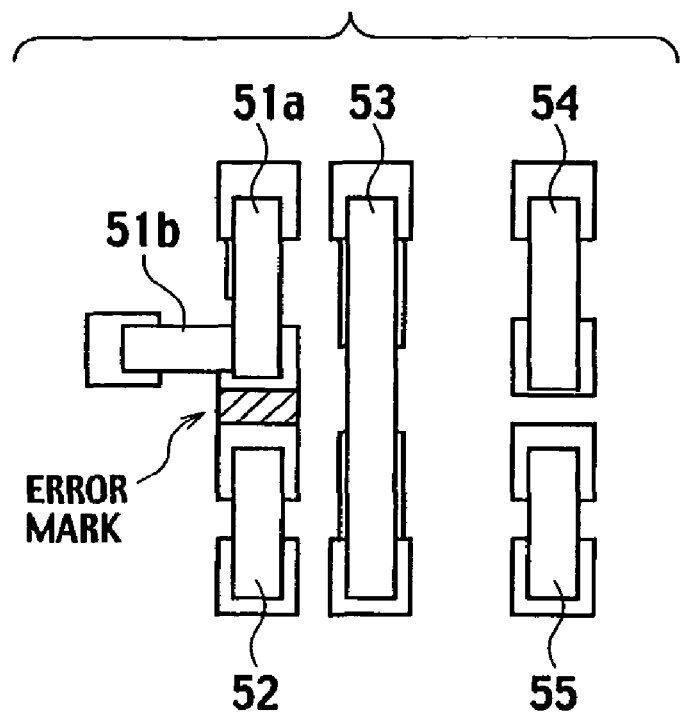
FIG. 12 is a layout example illustrating the comparative example of the results of the lithography rule check according to the first embodiment of the present invention.
Figure 13:
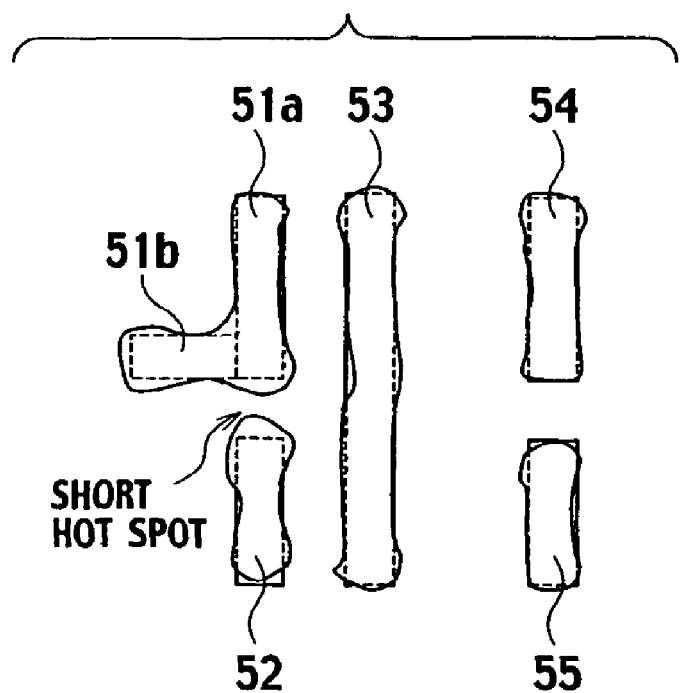
FIG. 13 is a layout example illustrating the comparative example of the results of the lithography rule check according to the first embodiment of the present invention.

As shown in FIG. 11, the OPC module 27 of FIG. 2 processes OPC for the patterns 51a, 51b, 52, 53, 54, and 55 on the layout. As shown in FIG. 12, the lithography rule check module 28 of FIG. 2 reads lithography rule check information stored in the data memory 2 and executes the lithography simulation to extract an error mark (an actual OPC hot spot) representing the fatal error, gray zone error, or the like located on the patterns 51a, 51b, 52, 53, 54, and 55 as shown in FIG. 12. As shown in FIG. 13, simulation images of the patterns 51a, 51b, 52, 53, 54, and 55 are thus obtained.

The layout modification module 30 of FIG. 1 extracts the actual OPC hot spot, which is not modified by the OPC verification module 25 and modifies the layout using software such as mask data preparation (MDP).

The data memory 2 of FIG. 1 includes at least a layout memory 14, a verification information memory 15, a layout modification information memory 16, and a design information memory 17. The layout memory 14 stores the information on the floorplan created by the layout module 10, the placement information of cells, wires, and vias in the chip area, and the like. The verification information memory 15 stores various types of information necessary for the verification module 20 to execute the verification of the layout. The layout modification memory unit 16 stores layout modification information to modify the layout. The design information memory 17 stores information necessary for design of the is semiconductor integrated circuit.

The input unit 4 of FIG. 1 includes a keyboard, a mouse, a light pen, a flexible disk unit, and the like. The operator can specify input and output data or set values necessary for automatic design through the input unit 4. It is possible to set layout parameters such as a form of output data and to enter instructions to execute and stop operations and the like through the input unit 4. The output unit 5 includes a display, a printer, and the like. The program memory 6 stores input and output data, the layout parameters, histories thereof, and data during calculation.

—Computer Automated Method—

Figure 14:
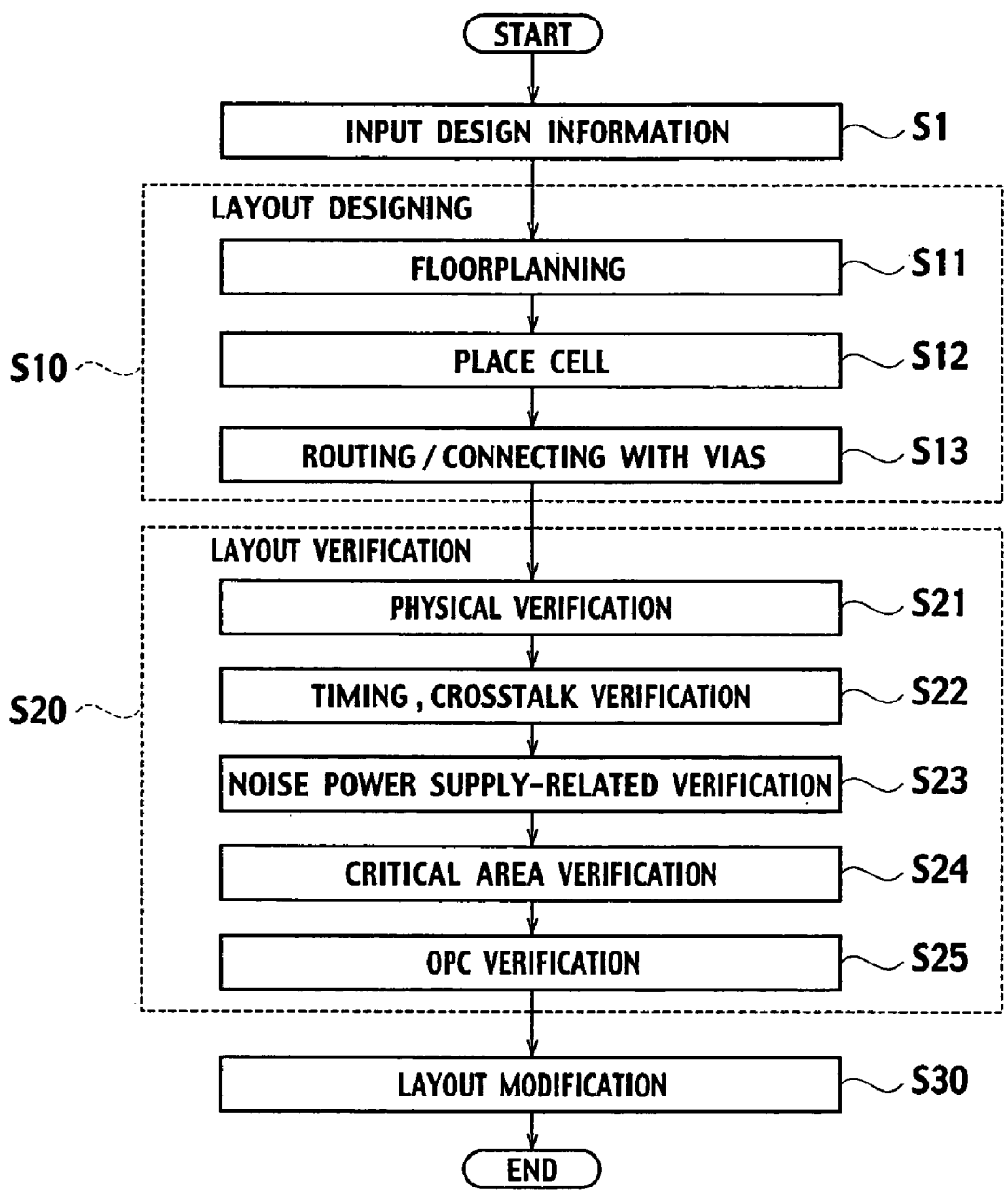
FIG. 14 is a flowchart illustrating a method of designing an integrated circuit according to the first embodiment of the present invention.

Using flowcharts shown in FIGS. 14 and 15, a description is given of an example of a method of designing a layout of a semiconductor integrated circuit using the design system shown in FIG. 1.

In step S1 of FIG. 14, various types of information necessary for layout design, verification, and modification of the semiconductor integrated circuit are stored in the design information memory 17 through the input unit 4 of FIG. 1.

In step S10, layout of the semiconductor integrated circuit is designed. Specifically, in step S11, the floorplan module 11 reads the design information stored in the design information memory 17, creates a floorplan of the semiconductor integrated circuit, and stores information of the floorplan in the layout memory 14. In step S12, the placement module 12 reads the information of the floorplan stored in the layout memory 14 and places logic cells, macro cells in the chip area. In step S13, the routing module 13 reads the information of the floorplan stored in the layout memory 14 and routes wires and connects wires with vias. The placement results of the cells, wires, vias, obtained in the process shown in the steps S12 and S13 is stored in the layout memory 14.

In step S20, various types of verification are performed for the layout designed in the step S10. Specifically, in step S21, the physical verification module 21 reads the software such as DRC and LVS stored in the verification information memory 15 and executes the physical verification for each pattern of the obtained layout. In step S22, the timing verification module 22 reads timing verification information and crosstalk verification information previously stored in the verification information memory 15 and verifies the timing verification, and crosstalk verification for the laid-out circuit. In step S23, the noise verification module 23 reads noise verification information and power supply-related verification information previously stored in the verification information memory 15 and execute noise verification generated from the chip and power supply verification. In step S24, the critical area verification module 24 reads the critical area information previously stored in the verification information memory 15 and verifies the portions (critical areas) problematic in the manufacturing process in the layout where the cells, wires, vias, and the like. The result of the verification performed in the process shown in the steps S21 to S24 is stored in the verification information memory 15.

In step S25, the OPC verification module 25 verifies the OPC problems caused in the layout based on the candidate hot spot verification information, OPC process information, lithography rule check information, and the like. The step S25 is described later in detail. The verification information after the OPC verification is stored in the verification information memory 15.

In step S30, the layout modification module 30 reads the layout modification information previously stored in the layout modification memory unit 16 and judges a transfer image of the layout whether the modification is needed. The layout modification module 30 reads the layout modification information. When the obtained transfer image includes a pattern problematic in design, the layout modification module 30 modifies the pattern in the layout and stores the information after the modification in the layout modification memory unit 16.

—Detail of OPC Verification Method—

A detailed description is given of the OPC verification method shown in the step S25 using the flowchart shown in FIG. 15.

In step S251, various types of information necessary for judgment and modification of the candidate OPC hot spots is inputted through the input unit 4 of FIG. 1 and stored in the verification information memory 15. Examples of the information stored in the verification information memory 15 are:

(a) as shown in FIG. 5, the mark information to place the marks on the contours of the patterns 51a, 51b, 52, 53, 54, and 55;

(b) as shown in FIGS. 6 and 7, the additional mark information and additional mark restriction information to place the additional mark on the contours of the patterns 51a, 51b, 52, 53, 54, and 55;

(c) as shown in FIG. 8, the area information (see FIGS. 16A to 16D) to place the areas on the marks and additional mark taking into account of an influence of the optical proximity effect and the grouping information to divide the areas into a plurality of groups such that adjacent areas are merged;

(d) as shown in FIG. 9, the candidate hot spot judgment information (see FIGS. 17 and 18) to judge the candidate OPC hot spot according to the total number of marks and additional marks included in each group; and (e) as shown in FIG. 10, the hot spot modification information to modify the candidate OPC hot spot (see FIGS. 19A to 21B). The examples of information shown in FIGS. 16A to 21B are described later in detail.

In step S252 of FIG. 15, the mark module 261 shown in FIG. 3 reads the mark information stored in the verification information memory 15 and, as shown in FIG. 5, places the marks on the vertices of the patterns 51a, 51b, 52, 53, 54, and 55. In step S253, when the additional mark is necessary, the mark module 261 reads the additional mark information stored in the verification information memory 15 and places the additional marks on the sides of the patterns 51a, 51b, 52, 53, 54, and 55. Furthermore, the mark module 261 reads the additional mark restriction information stored in the verification information memory 15 and determines the position of the additional mark to be placed on the patterns 51a and 51b.

In step S254, the grouping module 262 of FIG. 3 reads the area information stored in the verification information memory 15 and creates the areas 201-213 on each of the marks and additional mark. The areas 201-213 are set to the region strongly affected by the OPC substantially around each of the marks and additional mark placed by the mark module 261. The grouping module 262 divides the areas 201-213 into the plurality of groups 1-8 so that overlapping areas 201-204 are merged in the same polygon 220 as shown in FIGS. 8 and 9.

In step S255, the candidate hot spot judgment module 263 reads the candidate hot spot judgment information stored in the verification information memory 15 and extracts the candidate OPC hot spot as shown in FIG. 9. In step S256, the candidate hot spot judgment module 263 reads the candidate hot spot modification information stored in the verification information memory 15 and judges whether the extracted candidate OPC hot spot can be modified based on the candidate hot spot modification information stored in the verification information memory 15. When such modification is possible, the procedure proceeds to step S257, and the candidate hot spot modification module 264 reads the candidate hot spot modification information stored in the verification information memory 15. The candidate hot spot modification module 264 then increases spacing between the patterns 51a and 51b and the pattern 52 to modify the layout such that the number of marks within the group judged as the candidate OPC hot spot is reduced. When such modification is impossible, the procedure proceeds to step S258.

In step S258, the OPC module 27 of FIG. 2 reads the OPC processing information stored in the verification information memory 15 and, as shown in FIG. 11, executes the OPC process for each of the patterns 51a, 51b, 52, 53, 54, and 55 on the layout. In step S259, the lithography rule check module 28 reads the lithography rule check information stored in the verification information memory 15. The lithography rule check module 28 then executes the lithography simulation for a region where the candidate OPC hot spot is not modified to extract errors existing on the patterns 51a, 51b, 52, 53, 54, and 55, including the fatal and gray zone errors, and acquires the simulation images of the patterns 51a, 51b, 52, 53, 54, and 55.

Figure 22:
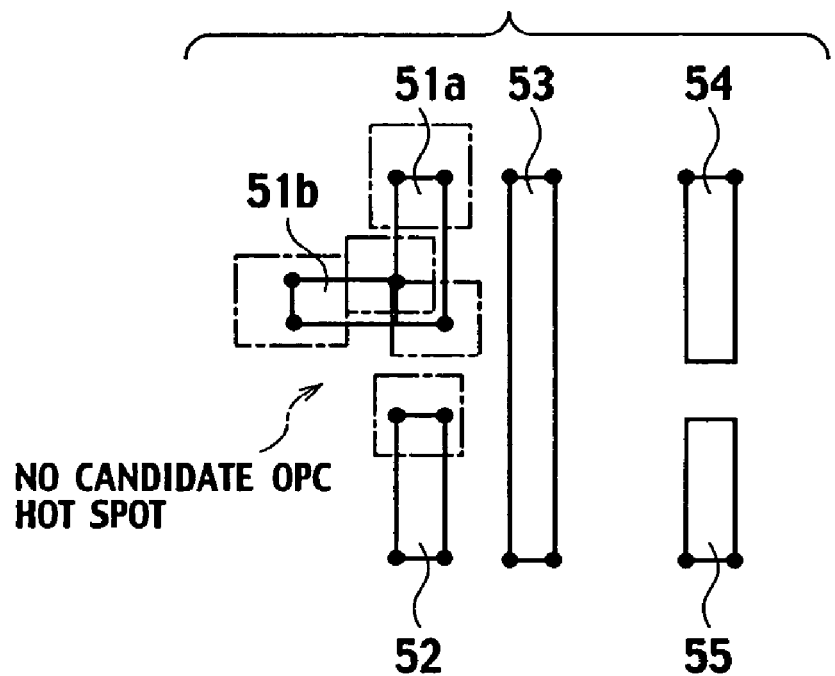
FIG. 22 is a schematic diagram illustrating layout results of OPC verification according to the first embodiment of the present invention.
Figure 23:
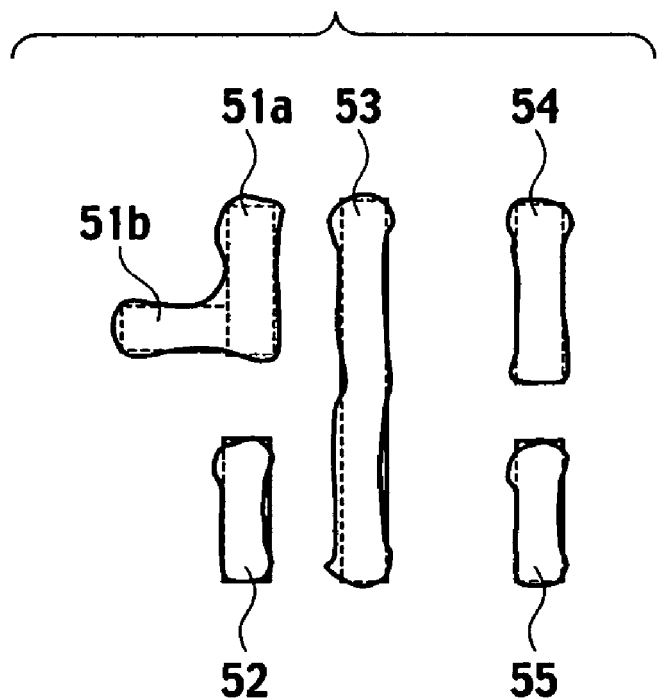
FIG. 23 is a schematic diagram illustrating layout results of OPC verification according to the first embodiment of the present invention.

With the method of designing the layout of a semiconductor integrated circuit according to the first embodiment, in the OPC verification process shown in the step S25 of FIG. 14, the group including more than a specified number of marks out of the marks placed on the contours of the patterns 51a, 51b, 52, 53, 54, and 55 is extracted as the candidate OPC hot spot. The region extracted as the candidate OPC hot spot is modified based on the candidate hot spot modification information stored in the verification information memory 15 of FIG. 1 by reducing the number of marks included in the group of interest. For example, in the example of the layout shown in FIG. 9, expanding the space between the pattern 51a and the pattern 52 eliminates the candidate OPC hot spot as shown in FIG. 22. The lithography rule check is not necessary for the part not including the candidate OPC hot spot. Accordingly, a comparatively large pattern in the chip area does not require a large amount of computer resources and processing time, and the verification can be performed for a practical period of time.

Figure 24:
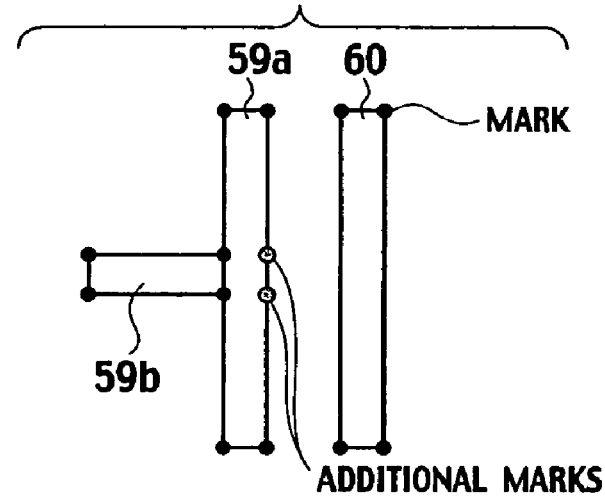
FIG. 24 is a schematic diagram illustrating layout results of OPC verification according to the first embodiment of the present invention.
Figure 25:
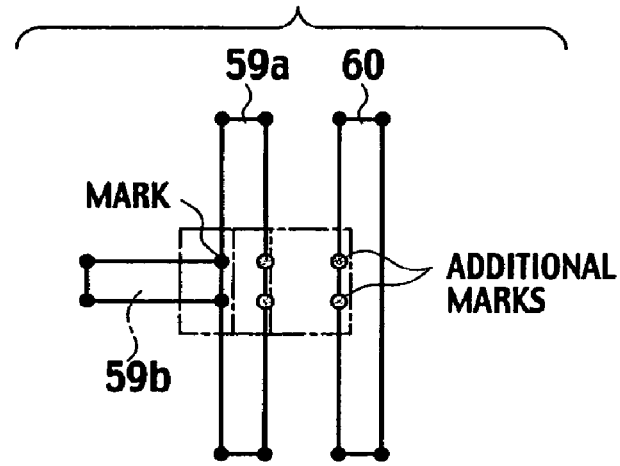
FIG. 25 is a schematic diagram illustrating layout results of OPC verification according to the first embodiment of the present invention.
Figure 26:
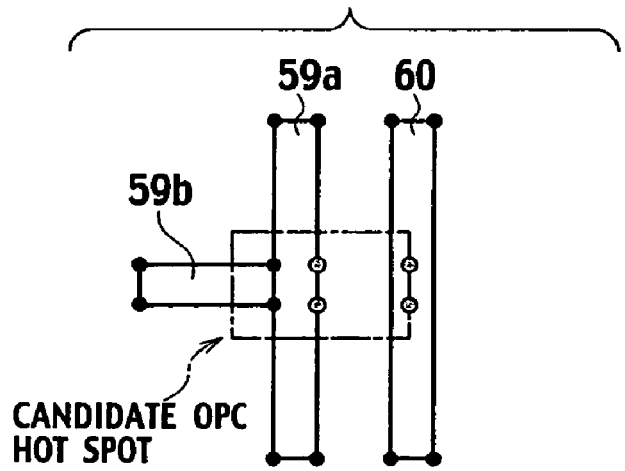
FIG. 26 is a schematic diagram illustrating layout results of OPC verification according to the first embodiment of the present invention.
Figure 27:
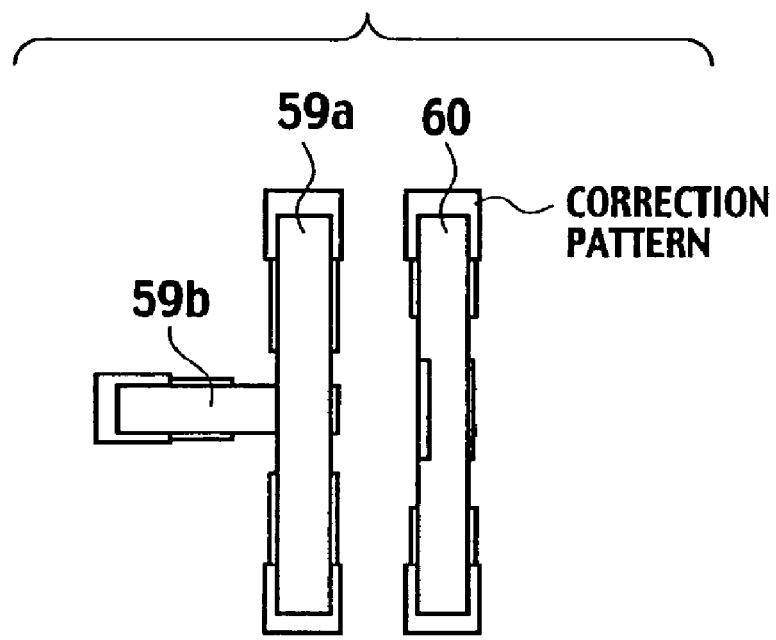
FIG. 27 is a schematic diagram illustrating layout results of OPC verification according to the first embodiment of the present invention.

FIGS. 24 to 29 show examples of the layout when the candidate OPC hot spots are not modified in the OPC verification process shown in the step S25 of FIG. 14. FIG. 24 shows a layout example where the marks and additional marks are placed at vertices of patterns 59a, 59b, and 60 by the mark module 261 shown in FIG. 3. FIG. 25 shows a layout example where the adjacent marks on the patterns 59a, 59b, and 60 are grouped by the grouping module 262 shown in FIG. 3. FIG. 26 shows a layout example where the candidate OPC hot spot is extracted by the candidate hot spot judgment module 263. FIG. 27 shows an example where the OPC process is performed without modification of the candidate OPC hot spot.

Figure 28:
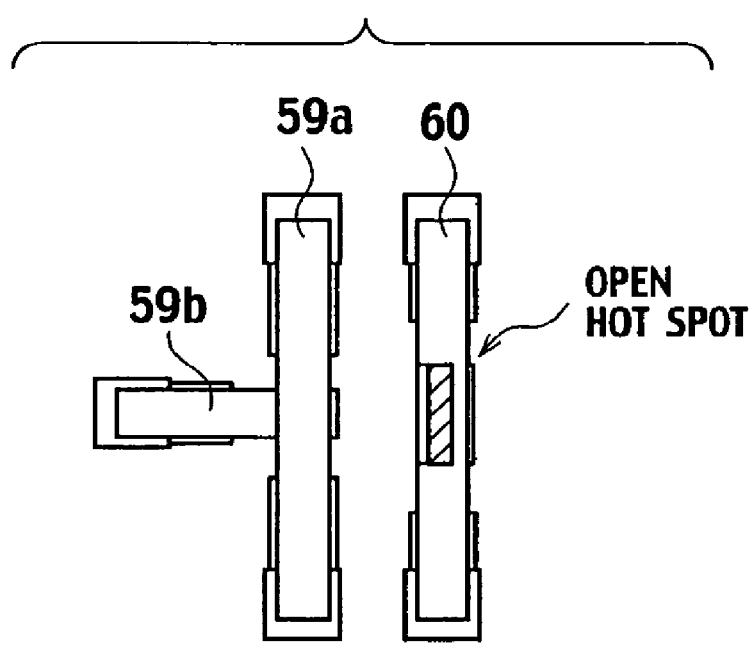
FIG. 28 is a schematic diagram illustrating layout results of OPC verification according to the first embodiment of the present invention.
Figure 29:
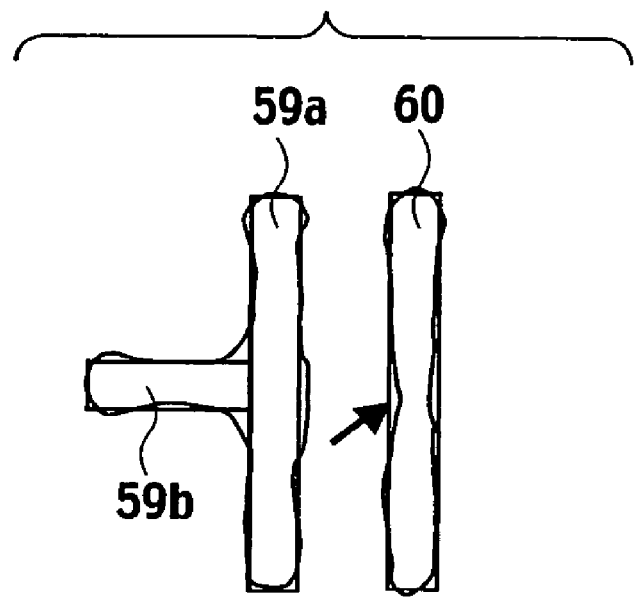
FIG. 29 is a schematic diagram illustrating layout results of OPC verification according to the first embodiment of the present invention.
Figure 30:
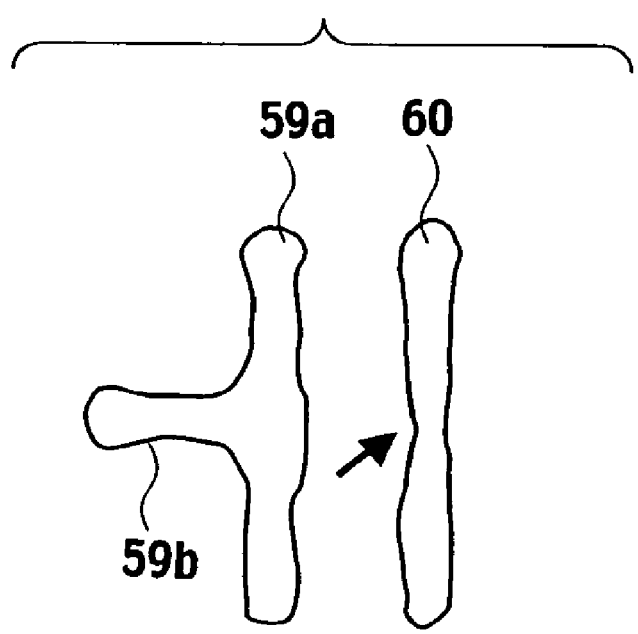
FIG. 30 is a schematic diagram illustrating layout results of OPC verification according to the first embodiment of the present invention.

When the lithography rule check is performed with the candidate hot spots not modified, as shown in FIG. 28, an open hot spot appears at a portion of the pattern 60 on a longitudinal extension of the pattern 59b. A simulation image outputted based on the layout example shown in FIG. 28 has a shape shown in FIG. 29, which shows that the pattern is narrowed at the open hotspot. As shown in FIG. 30, apparent from the desired pattern shape and a transfer image actually obtained, there is a defect in the pattern 60.

On the other hand, with the method of designing a semiconductor integrated circuit shown in the first embodiment, when there is the candidate OPC hot spot which can be modified based on the candidate hot spot modification information, the pattern at the actual OPC hot spot can be modified in advance. The defective pattern shown in FIG. 30 can be therefore prevented, thus improving the yield.

Some of the candidate OPC hot spots extracted in the OPC verification shown in FIG. 15 are difficult to modify based on the candidate hot spot modification information stored in the verification information memory 15 of FIG. 1. In each of the spots difficult to modify based on the candidate hot spot modification information, the actual OPC hot spots and regions therearound are selectively extracted by the lithography rule check module 28, and the extracted portions are partially subjected to the lithography rule check shown in step S259. The lithography rule check in the step S259 only needs to be performed for comparatively small areas including the actual OPC hot spots, which reduces the amount of processed data. Also in the lithography rule check, few gray zone errors are detected, thus allowing verification to be performed for a practical period of time.

Figure 31A:
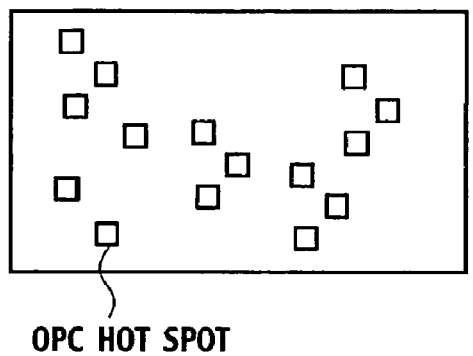
FIG. 31A is a schematic diagram illustrating detected OPC hot spots when the semiconductor integrated circuit has designed by earlier technique design method.
Figure 31B:
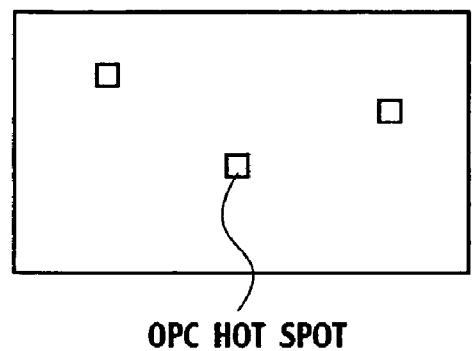
FIG. 31B is a schematic diagram illustrating detected OPC hot spots when the semiconductor integrated circuit has designed by the computer automated design method according to the first embodiment of the present invention.
Figure 31C:
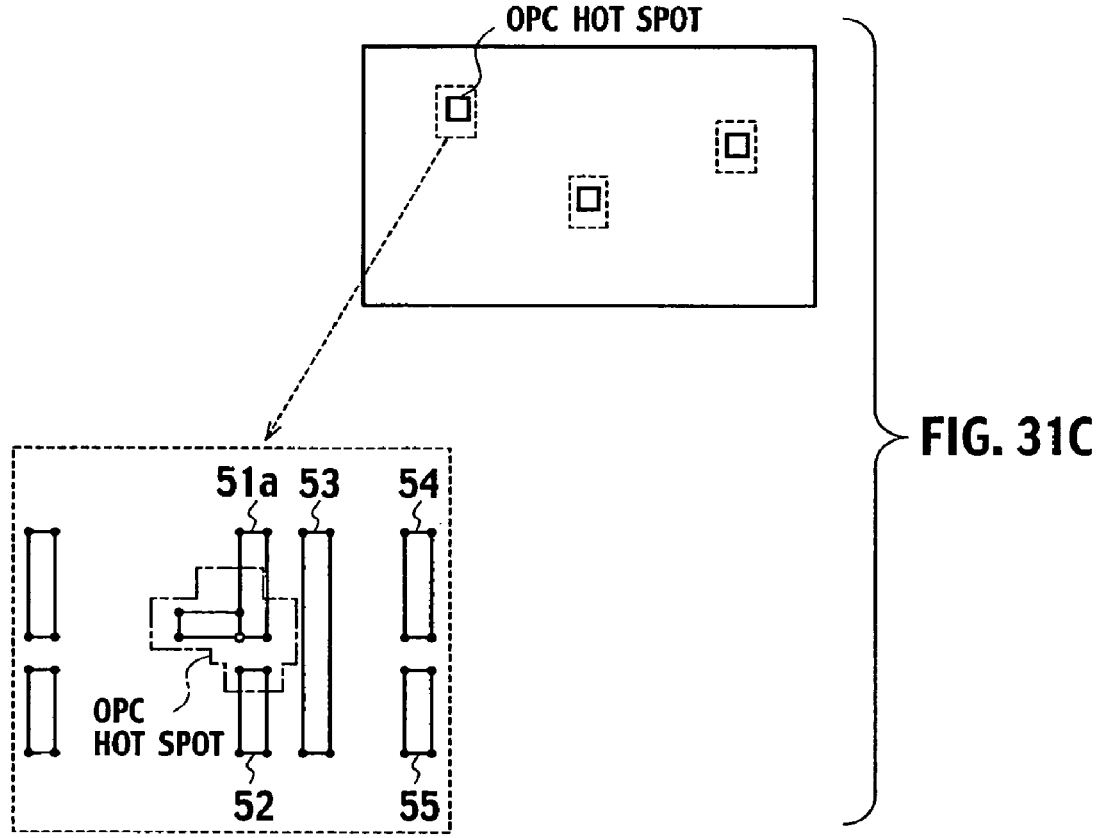
FIG. 31C is a schematic diagram illustrating detected OPC hot spots when the semiconductor integrated circuit has designed by the computer automated design method according to the first embodiment of the present invention.

FIGS. 31A to 31C show examples of the result of the lithography rule check after the OPC verification. When using an earlier technique design method which does not use the design method according to the first embodiment, as shown in FIG. 31A, a number of actual OPC hot spots appear in the chip area. The example shown in FIG. 31A can be also processed for a short time. However, when using the computer automated method according to the first embodiment, the actual OPC hot spots are previously modified by the processes shown in the steps S251 to S258, and, as shown in FIG. 31B, the actual OPC hot spots after the modification are fewer than that shown in FIG. 31A. Accordingly, as shown in FIG. 31C, in the case of carrying out the lithography rule check shown in the step S249, only the remaining OPC hot spots and regions therearound need to be subjected to the verification, and the lithography rule check and check of the OPC hot spots can be performed for a shorter time. It is therefore possible to provide the method of designing a semiconductor integrated circuit which is capable of implementing the measures for random and systematic defects with high speed and high accuracy.

—Examples of Area—

FIGS. 16A to 16D show examples of the area information to add the area taking into account of the optical proximity effect around the mark placed on the layout. Dimensions "a"

to "k" of areas 61 to 64 vary depending on the action of the OPC process shown in the step S258 of FIG. 15. The area information can be therefore determined by properly setting parameters of the dimensions "a" to "k" according to shapes of patterns 55 and 56 and positions of the marks. For example, as shown in FIG. 16A, when the marks are located at a line end, the area 61 is formed so that the dimension "d" of the area 61 parallel to the longitudinal direction of the pattern 55 is longer than the dimension "a" and the line end is wider than a dimension "w" of the pattern 55. As shown in FIG. 16B, when the mark is located at an outer corner of the pattern 56, the area 62 is formed so that the dimension "f" is longer than the dimension "d". As shown in FIG. 16C, when the mark is located at the inner corner of the pattern 56, the area 63 is formed so that the dimension "h" is longer than the dimension "g". As shown in FIG. 16D, when the mark is located on a side of the pattern 56, the area 64 with the dimension "j" longer than the dimension "i" and with a dimension of "2k".

—Examples of Candidate Hot Spot Judgment Information—

Figure 18:
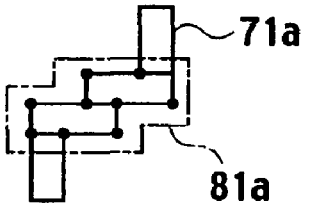
FIG. 18 is an example of geometries of OPC hot spot judgment information used in the OPC verification method according to the first embodiment of the present invention.

FIGS. 17 and 18 show examples of the candidate OPC hot spot judgment information with which the candidate hot spot judgment module 263 shown in FIG. 3 extracts and judges the candidate OPC hot spots on the layout. An example of the candidate hot spot judgment information stored in the verification information memory 15 of FIG. 1 is a numerical list indicating how many marks and additional marks are included in a group extracted as the candidate OPC hot spot. FIG. 18 shows examples of a group extracted as the candidate OPC hot spot and a group not extracted as the candidate OPC hot spot based on the numerical list shown in FIG. 17. As shown in FIG. 18(a), a group 81a including eight marks on a closed plane FIG. 71a matches a condition "for one closed plane figure, the total number of marks is seven or more" shown in FIG. 17. The group 81a is therefore extracted as the candidate OPC hot spot. As shown in FIG. 18(b), a group 83a is placed on two closed plane FIGS. 73a and 74a and includes six marks and one additional mark. In this case, the group 83a matches a condition "for two closed plane figures, the total number of marks is five or more" shown in the list of FIG. 17. The group 83a is therefore extracted as the candidate OPC hot spot. As shown in FIG. 18(c), a group 84a is placed on two closed plane FIGS. 75a and 76a and includes two marks and four additional marks. In this case, the group 84a matches the condition "for two closed plane figures, the total number of marks is five or more" shown in the list of FIG. 17. The group 84a is therefore extracted as the candidate OPC hot spot.

On the other hand, as shown in FIG. 18(d), a group 82a is placed on a closed plane pattern 72a and includes four marks and two additional marks. In this case, the group 82a does not match the condition "for one closed plane figure, the total number of marks is seven or more" shown in the list of FIG. 17. The group 82a is therefore not extracted as the OPC candidate hot spot. As shown in FIG. 18(e), a group 85a is placed on two closed plane FIGS. 77a and 78a and includes four marks. In this case, the group 85a does not match the condition "for two closed plane figures, the total number of marks is four and the number of additional marks is two" shown in the list of FIG. 17. The group 85a is not extracted as the candidate OPC hot spot.

—Examples of Candidate Hot Spot Modification Information—

Figure 19A:
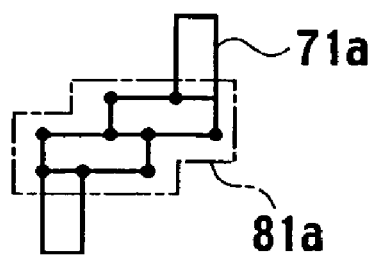
FIG. 19A is an example of pattern geometry before the OPC hot spot correction has been executed according to the first embodiment of the present invention.

FIGS. 19A to 21B show examples of the candidate hot spot modification information with which the candidate hot spot modification module 264 shown in FIG. 3 modifies the OPC candidate hot spots on the layout in the step S257 of FIG. 15. FIGS. 19A, 20A, and 21A show patterns before modification, and FIGS. 19B, 20B, and 21B show patterns after modification.

Figure 19B:
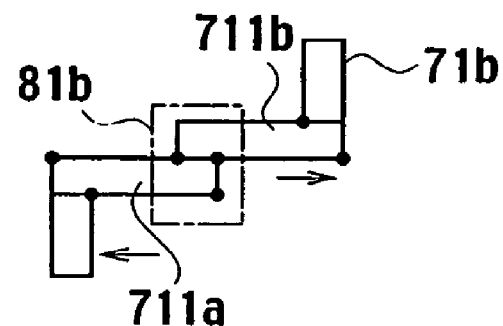
FIG. 19B is an example of pattern geometry after the OPC hot spot correction has been executed according to the first embodiment of the present invention.
Figure 20A:
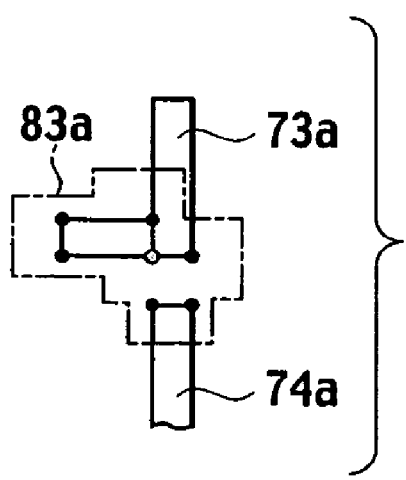
FIG. 20A is an example of pattern geometry before the OPC hot spot correction has been executed according to the first embodiment of the present invention.
Figure 20B:
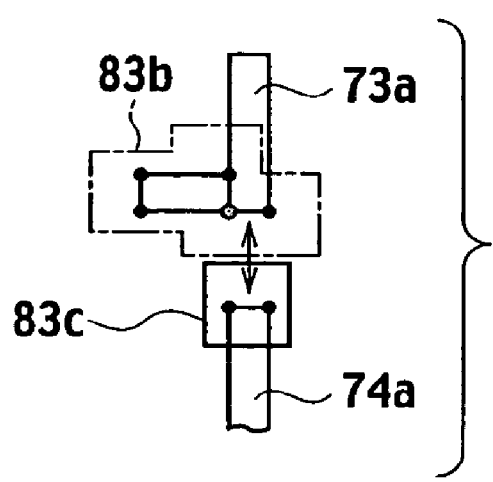
FIG. 20B is an example of pattern geometry after the OPC hot spot correction has been executed according to the first embodiment of the present invention.

When the group 81 includes eight marks as shown in FIG. 19A, a pattern 71b with extended patterns 711a and 711b is formed so that the number of marks included in a group 81b is reduced as shown in FIG. 19B. When the group 83a includes six marks and one additional mark as shown in FIG. 20A, a pattern 73a and a pattern 74a are separated apart from each other so that the number of marks in the group 83a is reduced, thus dividing the group 83a of FIG. 20A into groups 83b and 83c as shown in FIG. 20B. When the group 84a includes two marks and four additional marks as shown in FIG. 21A, as shown in FIG. 21B, a pattern 75b and a pattern 76b are separated apart from each other so that the number of marks in the group 84a is reduced and the additional marks on the pattern 76b are not included in the group 84b.

—Method of Manufacturing an Integrated Circuit—

Referring to FIG. 32, a description is given of a method of manufacturing a semiconductor integrated circuit according to the first embodiment. The method of manufacturing a semiconductor integrated circuit according to the first embodiment includes, as shown in FIG. 32, a design process in step S300, a mask manufacturing process in step S400, a semiconductor manufacturing process in step 500, and an inspection process in step S600. Products are then conveyed to a shipping process in step S700.

In the step S300, mask data is created based on results of various simulations such as a process simulation. Specifically, in the layout design process of the step S10, the layout information including a plurality of patterns to place cells, wires, vias, and the like in the chip area is created based on the floorplan.

In the layout verification process shown in the step S20, the physical verification, timing verification, crosstalk verification, noise verification, verification regarding power supply, and OPC verification are performed. In the OPC verification, the plurality of marks are placed on contours of patterns included in the layout information and classified into a plurality of groups such that adjacent marks are grouped. Subsequently, candidate hot spots in the patterns are extracted based on the number of marks included in each group. When the candidate hot spots in the patterns can be modified based on the candidate hot spot information stored in the verification information memory 15, the layout is modified so that the number of marks included in the group of interest is reduced. In the step S30, transfer images of the patterns included in the layout information are formed. When the transfer images include a pattern problematic in the design process, the layout information is modified.

In the step S400, based on the obtained mask data, a set of masks (reticles) necessary for a substrate process, a wiring process, and the like are manufactured with a predetermined alignment margin by means of a pattern generator such as an electron beam lithography. In the substrate process shown in step S510, a plurality of chip patterns are periodically arranged on a semiconductor wafer by a projection lithography (stepper) using reticles necessary for respective processes (manufacturing process) for microfabrication (substrate process).

Specifically, in step S511, for example, a silicon oxide film is deposited on a silicon substrate. In step S512, a photoresist film is applied to the silicon oxide film. In step S513, a photolithography process is carried out using one of the set of reticles manufactured for the substrate process to delineate the photoresist film. In step S514, the silicon oxide film is selectively etched using the patterned photoresist film as a mask. Using the photoresist film and silicon oxide film as a mask, for example, p+ or n+ impurity ions are selectively implanted into the surface of the silicon substrate. Thereafter, the photoresist used as the mask for the ion implantation is removed. Furthermore, in step S515, the implanted ions are activated and driven (diffused) into a desired depth to form an impurity diffusion region inside the silicon substrate. The various processes shown in the steps S511 to S515 are carried out serially using reticles in the set of reticles to form transistors and the like of each cell.

In a surface wiring process of step S520, similarly, the substrate surface is subjected to a wiring process by forming a desired pattern with a stepper using a reticle necessary for each process. Specifically, as shown in step S521, for example, an interlayer insulating film is formed on the silicon substrate by means of CVD, PVD, or the like, and the surface thereof is flattened by chemical mechanical polishing (CMP). In step S522, photoresist is applied on an interlayer insulating film, and a photoresist film is patterned by a photolithography process using one of the set of reticles manufactured for the surface wiring process to form an etching mask in step S523. In step S524, using the etching mask, reactive ion etching (RIE) or the like is performed to form vias in the interlayer insulating film. The photoresist is then removed, and the surface is washed. Thereafter, in step S525, metal is deposited in the vias. Another etching mask is then formed by the photolithography process, and the series of processes, including pattering the metallic film, is repeated using the reticles in the set of reticles, thus forming a multi-level interconnect.

When the processes shown in steps S510 to S520 is completed, in step S530, the wafer is divided into chips of a predetermined chip size by means of dicing equipment such as a diamond blade (dicing process). Each chip is mounted on a packaging material (mount process), and electrode pads of the chip and leads of a lead frame are connected to each other with gold wires or bumps (bonding process). Next, a required package assembly process such as resin sealing is carried out (sealing process).

In step S600, inspections, including a property inspection concerning performances and functions of a semiconductor device, inspection of lead shape and size, and a reliability test, are carried out (inspection process), thus completing the semiconductor device. In step S700, a semiconductor device which has cleared all the above processes is put into a package for protection from moisture, static electricity and the like and then shipped as a product.

With the method of manufacturing a semiconductor integrated circuit according to the first embodiment, regions which could be the actual OPC hot spots (candidate hot spots) are previously extracted and corrected by adding marks to each pattern, grouping adjacent marks, and measuring density of the patterns when the OPC verification is performed for the obtained layout in the layout verification process of the step S20. Accordingly, compared with the case where the judgment of the actual OPC hot spots of the transfer patterns is made after all the layout design and verifications are completed, the actual OPC hot spots are fewer, thus reducing the processing time for the verifications and improving the yield.

Figure 33:
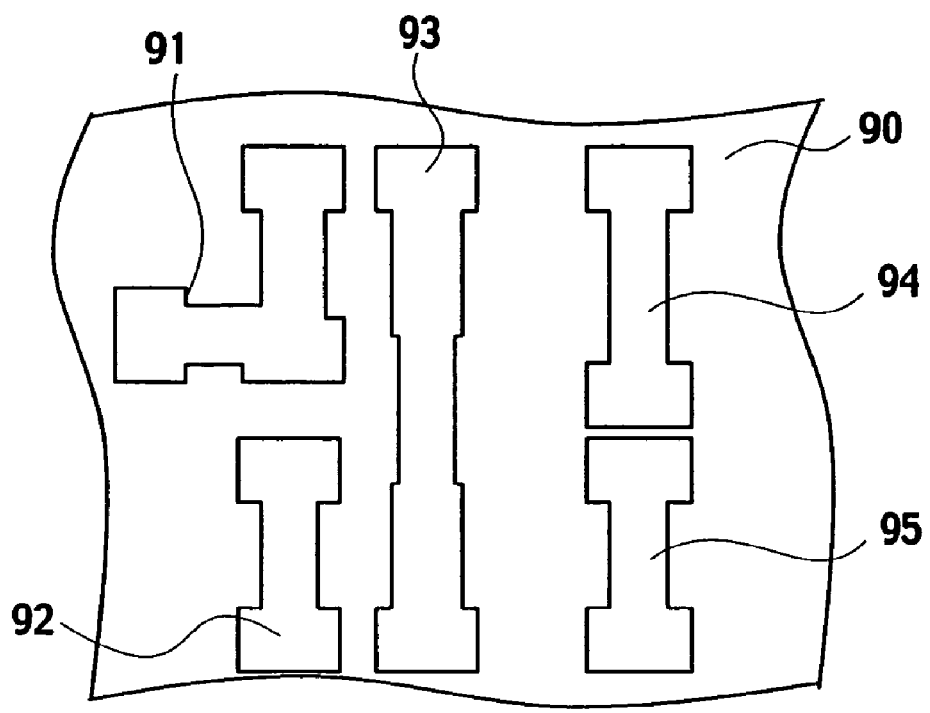
FIG. 33 is a plan view illustrating an example of a mask provided by the method of manufacturing the semiconductor device according to the first embodiment of the present invention.
Figure 34:
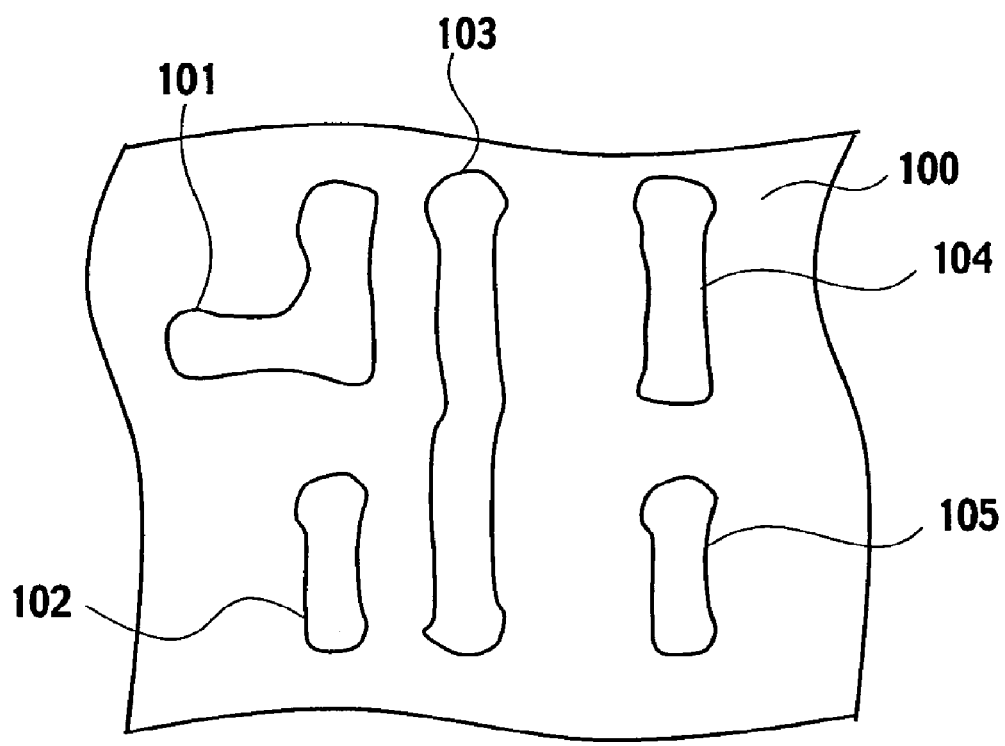
FIG. 34 is a plan view illustrating an example of an integrated circuit fabricated by the mask as shown in FIG. 33.

FIG. 33 shows an example of a mask which can be manufactured using the method of manufacturing a semiconductor integrated circuit according to the first embodiment. FIG. 33 is an example of a mask 90 manufactured using the layout shown in FIG. 11. On the mask 90, line patterns 91 to 95, each including a rectangular correction portion at line end portions and the like, are placed. On the other hand, FIG. 34 shows an example of a plan view when wires 101 to 105 are formed on an interlayer insulating film 100 using the mask 90 shown in FIG. 33. As shown in FIG. 34, the desired wires 101 to 105 are formed on the interlayer insulating film without errors. Among the OPC hot spots, a spot which is not judged as an error in the lithography rule check is also extracted. The extracted spot could be an error when the process condition changes. However, with the method of manufacturing a semiconductor integrated circuit according to the first embodiment, it is possible to make a design robust to changes in the process, thus making it possible to manufacture desired patterns on the interlayer insulating film 100 with higher yield.

Modification of the First Embodiment

The method of placing the marks on the layout in the steps S251 and S252 of FIG. 15, which is carried out by the mark module 261 shown in FIG. 3, is not limited to the aforementioned method and can be other various methods.

Figure 35:
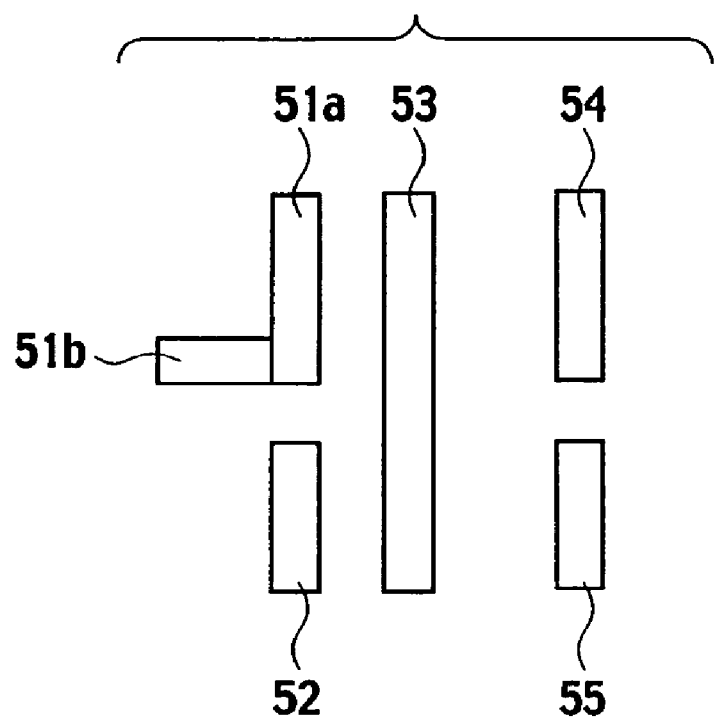
FIG. 35 is a layout example illustrating the OPC hot spot verification method according to the first embodiment of the present invention.
Figure 36:
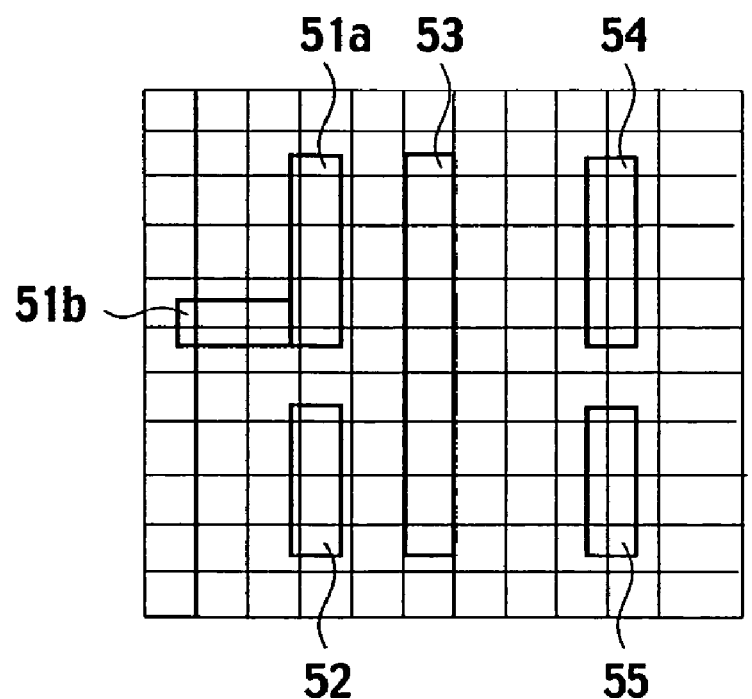
FIG. 36 is a layout example illustrating the OPC hot spot verification method according to the first embodiment of the present invention.
Figure 37:
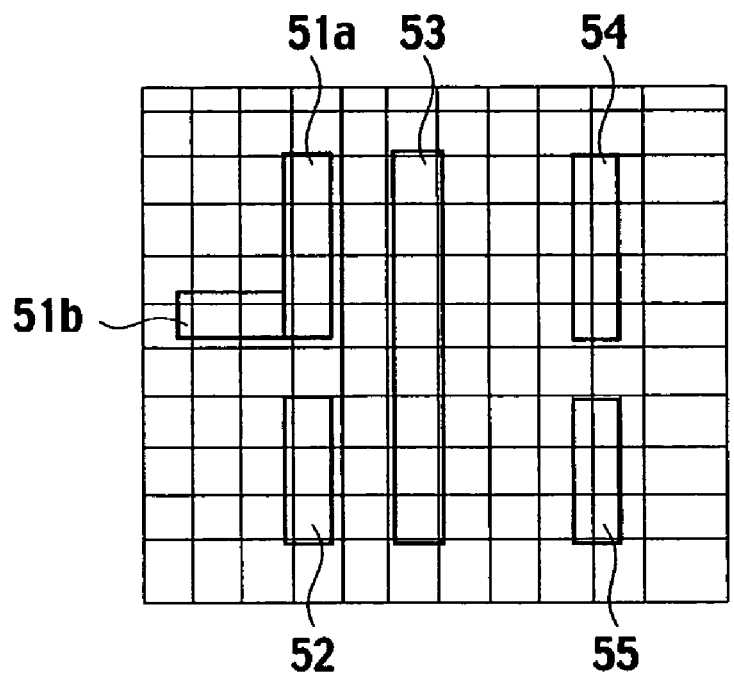
FIG. 37 is a layout example illustrating the OPC hot spot verification method according to the first embodiment of the present invention.
Figure 38:
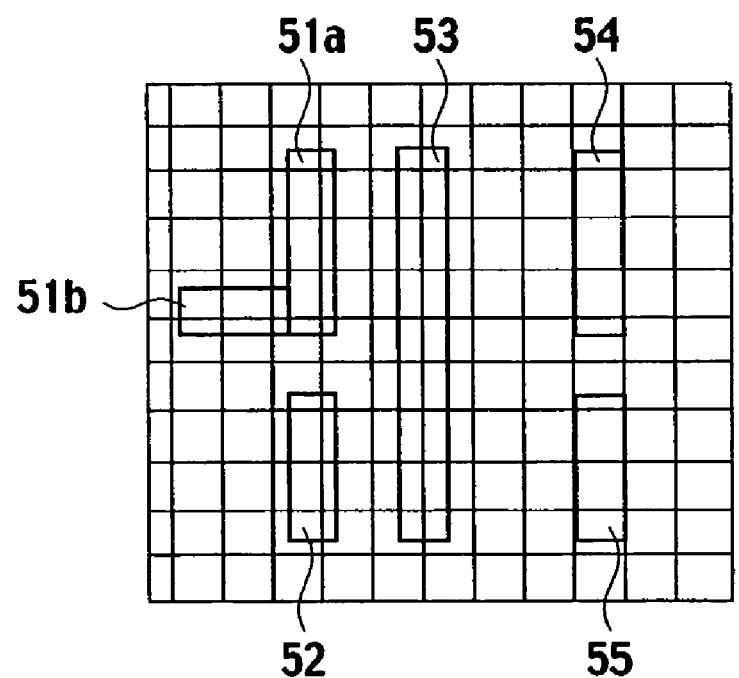
FIG. 38 is a layout example illustrating the OPC hot spot verification method according to the first embodiment of the present invention.
Figure 39A:
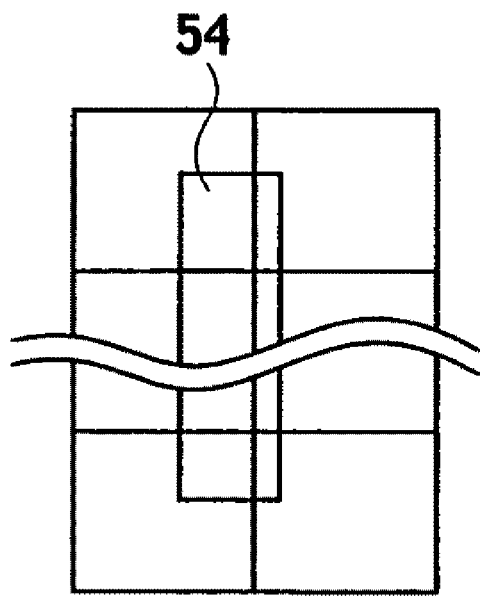
FIG. 39A is a layout example illustrating the OPC hot spot verification method according to the first embodiment of the present invention.
Figure 39B:
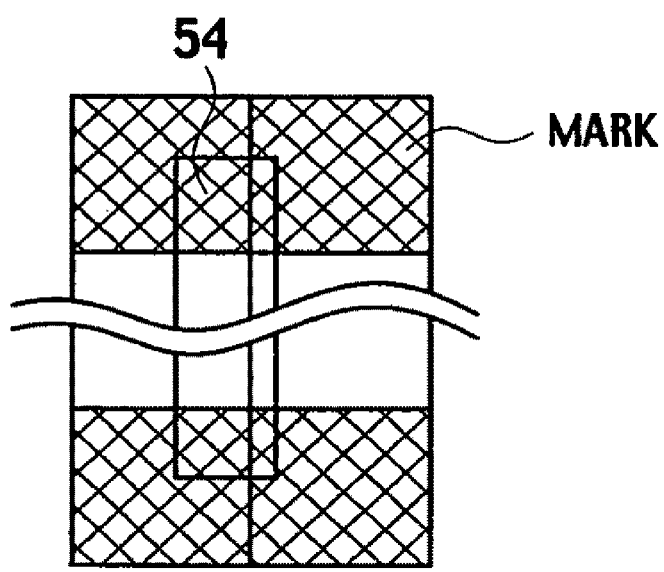
FIG. 39B is a layout example illustrating the OPC hot spot verification method according to the first embodiment of the present invention.
Figure 40:
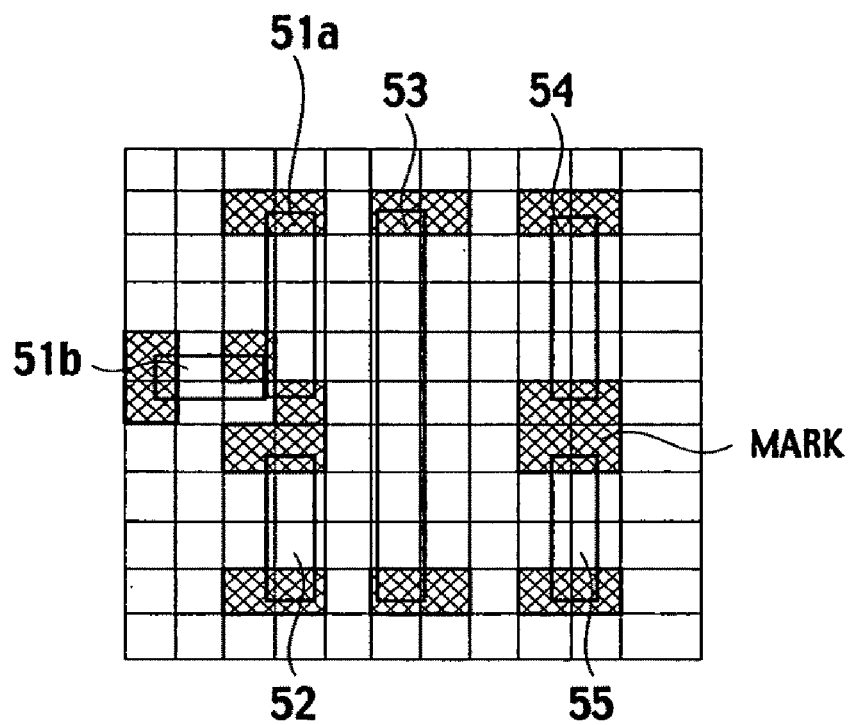
FIG. 40 is a layout example illustrating the OPC hot spot verification method according to the first embodiment of the present invention.
Figure 41:
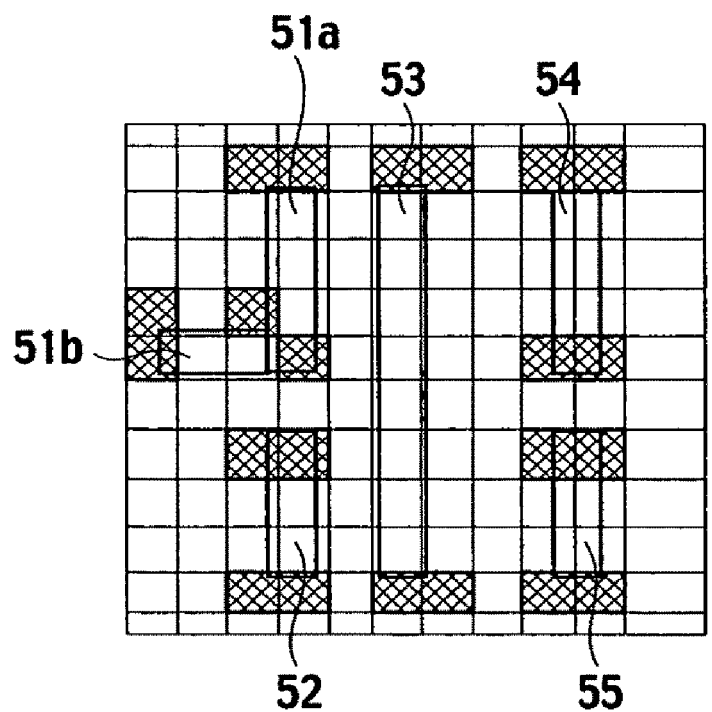
FIG. 41 is a layout example illustrating the OPC hot spot verification method according to the first embodiment of the present invention.
Figure 42:
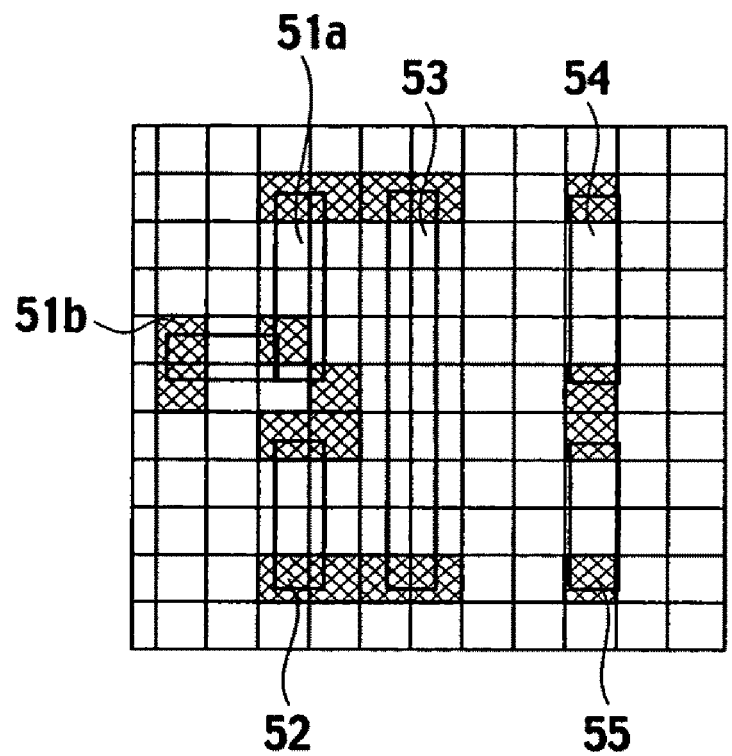
FIG. 42 is a layout example illustrating the OPC hot spot verification method according to the first embodiment of the present invention.
Figure 43:
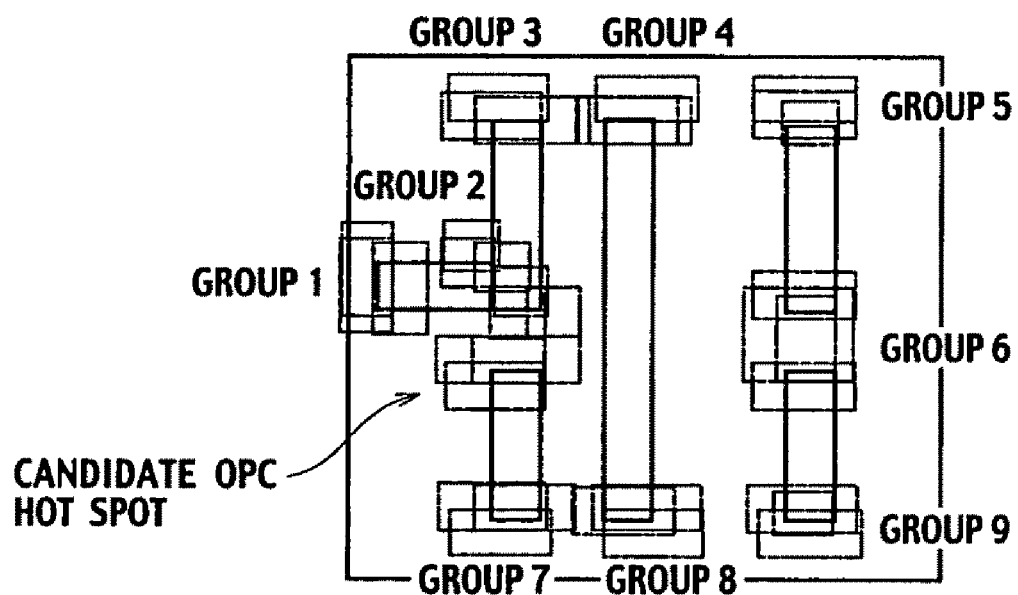
FIG. 43 is a layout example illustrating the OPC hot spot verification method according to the first embodiment of the present invention.

For example, a layout shown in FIG. 35 is defined by a plurality of rectangular regions by a plurality of grids extending in two directions orthogonal to each other as shown in FIG. 36. The positions of the grids are shifted little by little with respect to the layout to form a plurality of patterns each defined by the grids. Furthermore, as shown in an enlarged view of FIGS. 39A and 39B, marks are given to regions where vertices of a pattern 54 are located. The marks are added in each pattern shown in FIGS. 36 to 38. FIGS. 40 to 42 shows results of FIGS. 36 to 38. Thereafter, as shown in FIG. 43, the layouts shown in FIGS. 40 to 42 are superimposed. Regions where the marks overlap each other are merged and grouped by the grouping module 262 shown in FIG. 3, and a wide region where the marks overlap each other is extracted as the candidate OPC hot spot.

Figure 44:
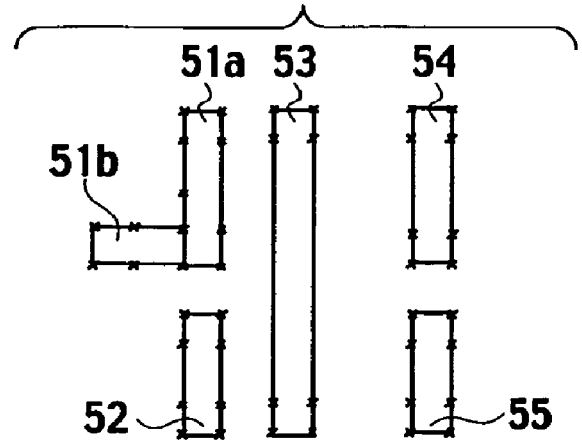
FIG. 44 is a layout example illustrating the OPC hot spot verification method according to the first embodiment of the present invention.
Figure 45:
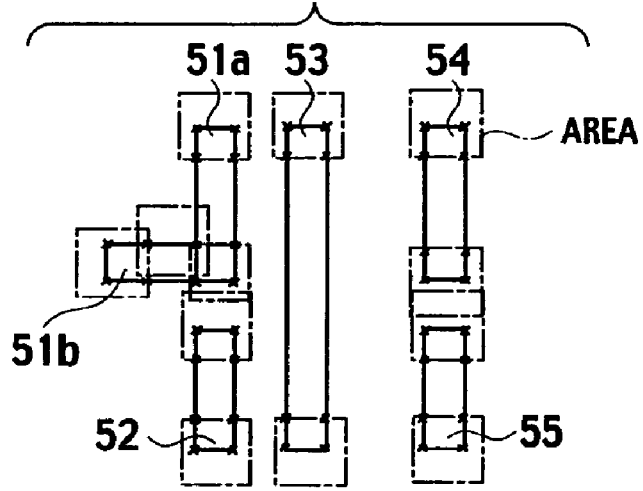
FIG. 45 is a layout example illustrating the OPC hot spot verification method according to the first embodiment of the present invention.
Figure 46:
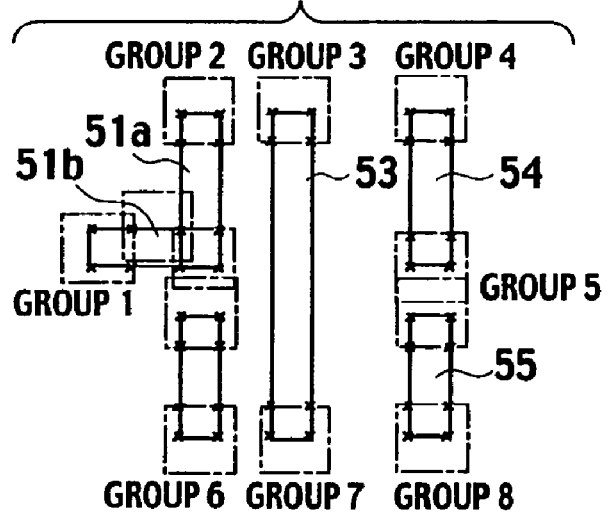
FIG. 46 is a layout example illustrating the OPC hot spot verification method according to the first embodiment of the present invention.

In another method, as shown in FIG. 44, marks to divide sides of patterns 51a, 51b, 52, 53, 54, and 55 into several sections are placed on end portions of the patterns 51a, 51b, 52, 53, 54, and 55, and as shown in FIG. 45, the areas are placed around the individual marks. Thereafter, as shown in FIG. 46, adjacent marks are classified into a group by the grouping module 262 shown in FIG. 3, and the candidate OPC hot spots can be extracted in the same manner as the aforementioned method.

Second Embodiment

—Computer Automated System—

Figure 47:
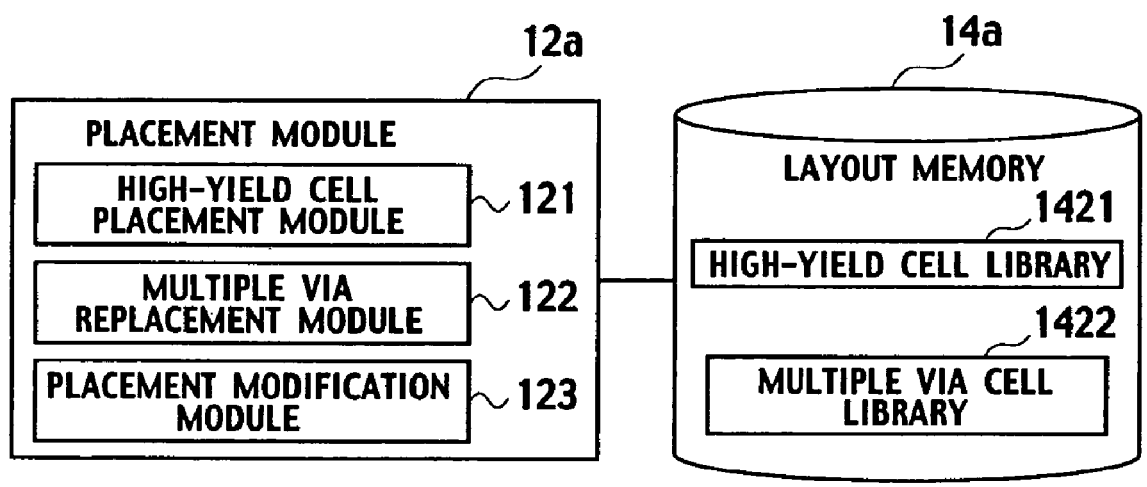
FIG. 47 is a block diagram illustrating a computer automated system for designing an integrated circuit according to a second embodiment of the present invention.

As shown in FIG. 47, a computer automated system for designing an integrated circuit according to a second embodiment includes a placement module 12a and a layout memory 14a. The placement module 12a includes a high yield cell placement module 121, a multiple via replacement module 122, and a placement modification module 123. The layout memory 14a includes a high yield cell library 1421 and a multiple via cell library 1422. The other members are substantially the same as those of the computer automated system for designing an integrated circuit as shown in FIG. 1.

Figure 48:
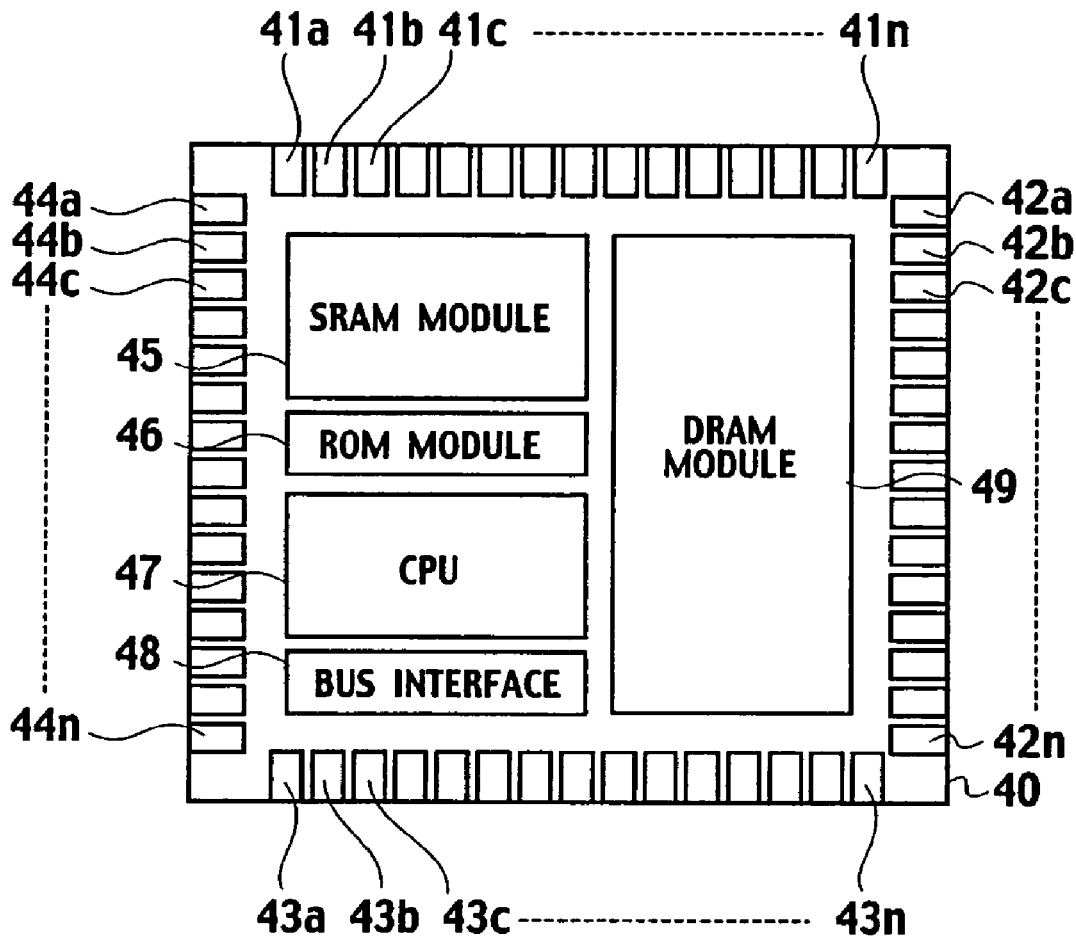
FIG. 48 is a plan view illustrating layout information designed by a computer automated system for designing an integrated circuit according the second embodiment of the present invention.
Figure 49:
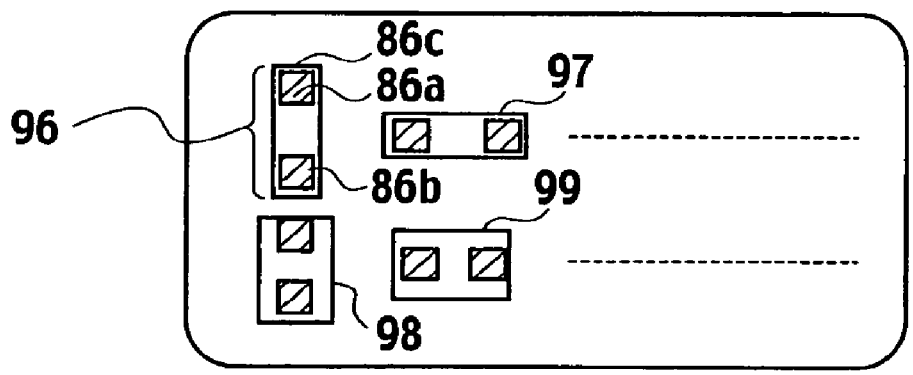
FIG. 49 is a layout example illustrating pattern geometries of multiple via cell library according to the second embodiment of the present invention.

The high yield placement module 121, as shown in FIG. 48, places high-yield cells (a SRAM module 45, a ROM module 46, a CPU 47, a bus interface 48, a DRAM module 49, and the like), in which cells, wires, vias and the like have been already placed and verified, in a region surrounded by I/O cells 41a to 41n, 42a to 42n, 43a to 43n, and 44a to 44n, which are placed in the periphery of a chip area 40. The multiple via replacement module 122 replaces one via (single via) placed by the placement module 12 to connect wires with a plurality of vias (multiple vias). The placement modification module 123 modifies a region where design violation occurs when the multiple via replacement module 122 replaces the single via to the multiple vias. The high-yield cell library 1421 stores information on the high-yield cells with various shapes. The multiple via cell library 1422 stores information on multiple via cells 96 to 99 with various shapes as shown in FIG. 49.

—Computer Automated Method—

Figure 50:
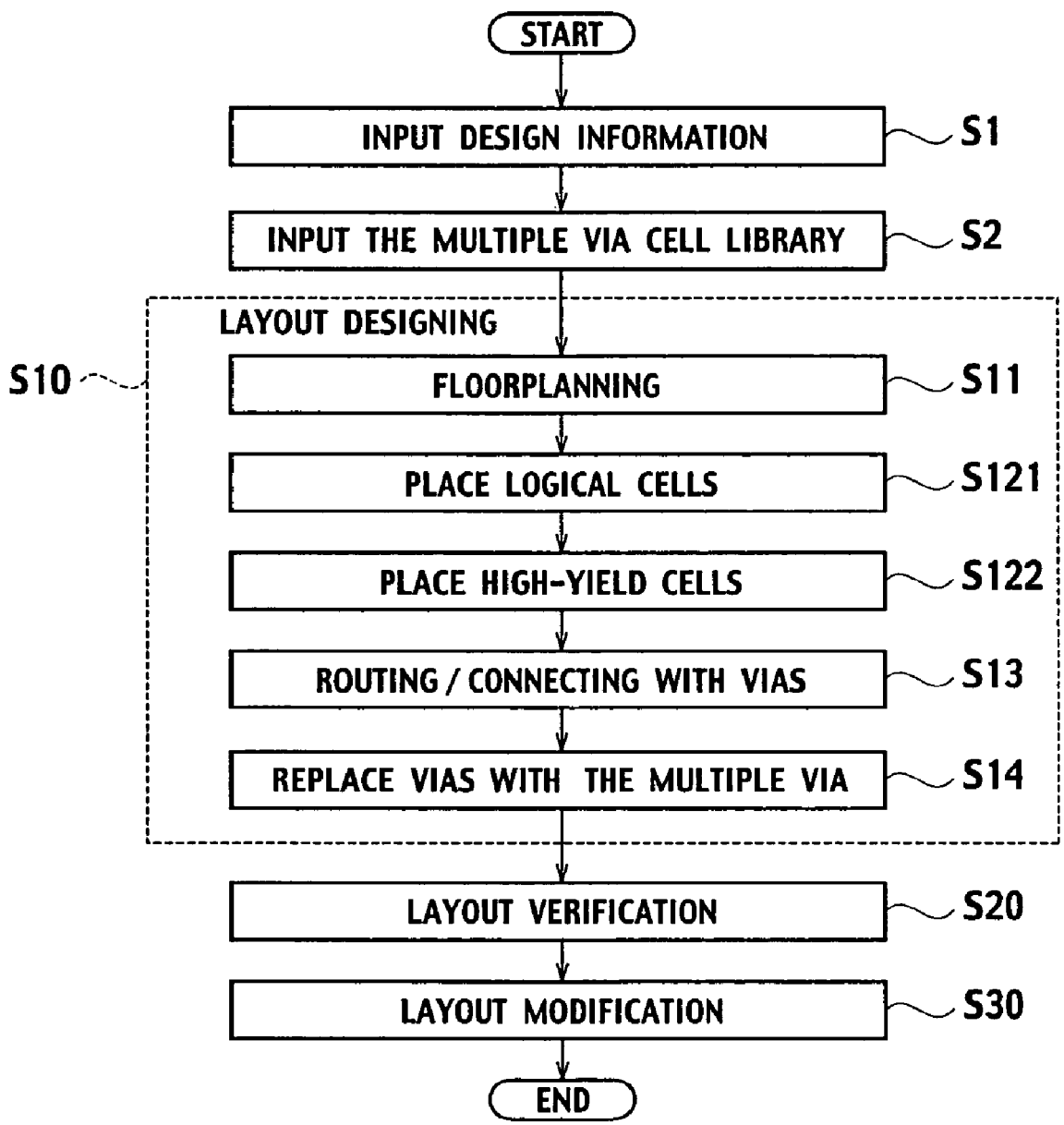
FIG. 50 is a flowchart illustrating a method of designing an integrated circuit according to the second embodiment of the present invention.
Figure 51:
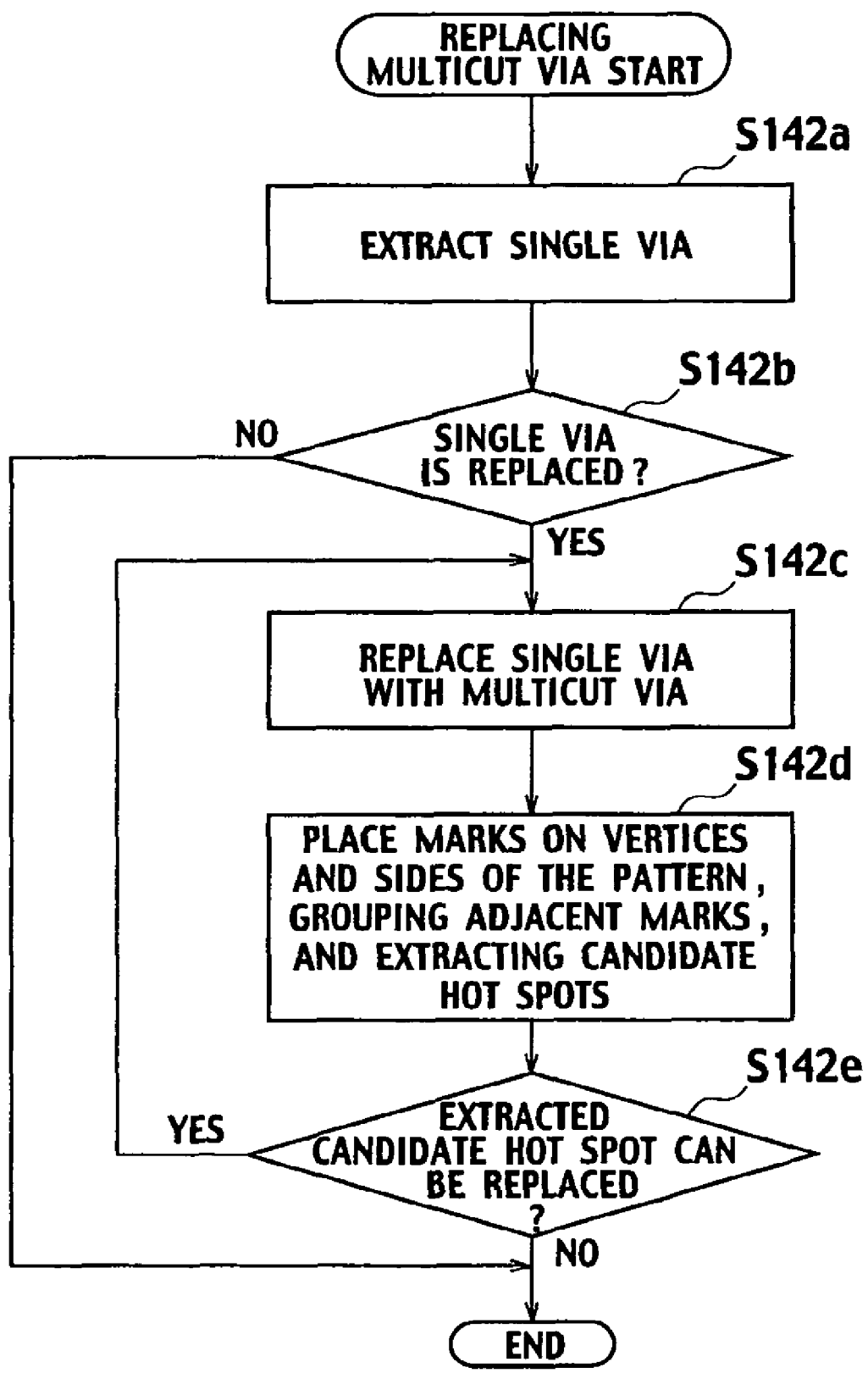
FIG. 51 is a flowchart illustrating the method of designing the integrated circuit according to the second embodiment of the present invention.

A description is given of a computer automated method of designing a semiconductor integrated circuit according to the second embodiment using flowcharts of FIGS. 50 and 51.

In step S1 of FIG. 50, various types of information necessary for layout design, verification, and modification of the semiconductor integrated circuit are inputted into the design information memory 17 and the program memory 6 of FIG. 1 through the input unit 4. In step S2, the information on the high yield cells placed in the chip area and the multiple via cell information to connect wires through the multiple vias are inputted into the high-yield cell library 1421 and the multiple via cell library 1422 of FIG. 47, respectively.

In step S10, the layout module 10 reads the design information stored in the design information memory 17, the layout information stored in the layout memory 14, and the like and places the cells, wires, vias, and the like in the chip area. In step S11, the floorplan module 11 reads the design information stored in the design information memory 17 and creates a floorplan of the semiconductor integrated circuit. The floorplan module 11 stores information on the floorplan in the layout memory 14.

In step S121, the placement module 12 reads the information of the floorplan stored in the layout memory 14 and places logical cells in the chip area. In step S122, the high-yield cell placement module 121 reads the information of the floorplan stored in the layout memory 14 and places the high-yield cells in the chip area. In step S13, the routing module 13 reads the information of the floorplan stored in the layout memory 14 and routes wires in the chip area and connect wires with vias and contacts.

In step S14, the multiple via replacement module 122 reads the information of the multiple via cell library stored in the multiple via cell library 1422 and replaces multiple vias for a single via which could cause a design problem out of the single vias placed on the layout patterns. The step S14 is described later in detail.

In step S20, the layout verification is performed for the layout designed in the step S10. In step S30, the layout modification module 30 reads the layout modification information stored in the layout modification memory unit 16 and performs judgment and modification using a transfer image of the layout.

—Details of Multiple via Replacement—

A description is given of the method of replacing the multiple vias shown in step S14 using the flowchart shown in FIG. 51.

Figure 52:
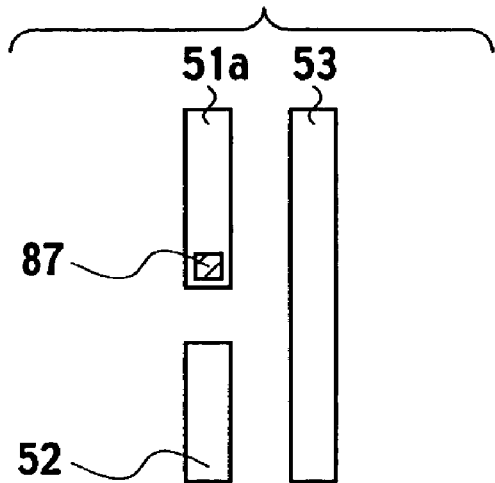
FIG. 52 is a layout example illustrating a method of providing multiple vias in the integrated circuit according to the second embodiment of the present invention.

In step S142a, the multiple via replacement module 122, as shown in FIG. 52, extracts a single via 87, which causes a design violation and extracted by DRC or the like. In step S142b, the multiple via replacement module 122 reads the information of the multiple via cell library stored in the multiple via cell library 1422 and determines whether the single via 87 is replaced with one of multiple via cells 96 to 99 shown in FIG. 49. When the single via 87 is not replaced, the placement of the multiple vias is terminated. When the single via 87 is replaced, the process goes to step S142c. In the step S142c, the multiple via replacement module 122 reads the multiple via cells 96 to 99 stored in the multiple via cell library 1422 of FIG. 47 and replaces the single via 87 shown in FIG. 52 with the multiple via cell 97.

Figure 53:
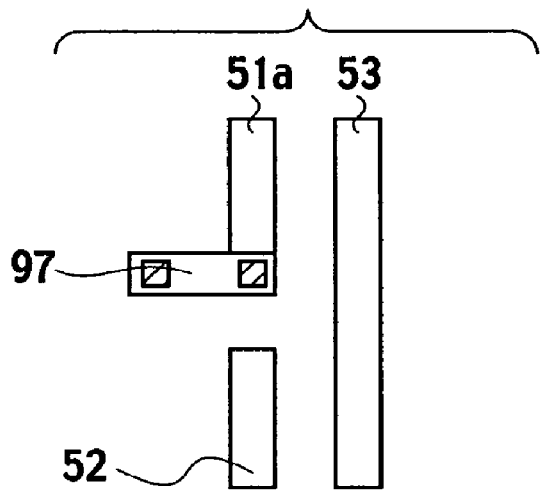
FIG. 53 is a layout example illustrating the method of providing multiple vias in the integrated circuit according to the second embodiment of the present invention.
Figure 54:
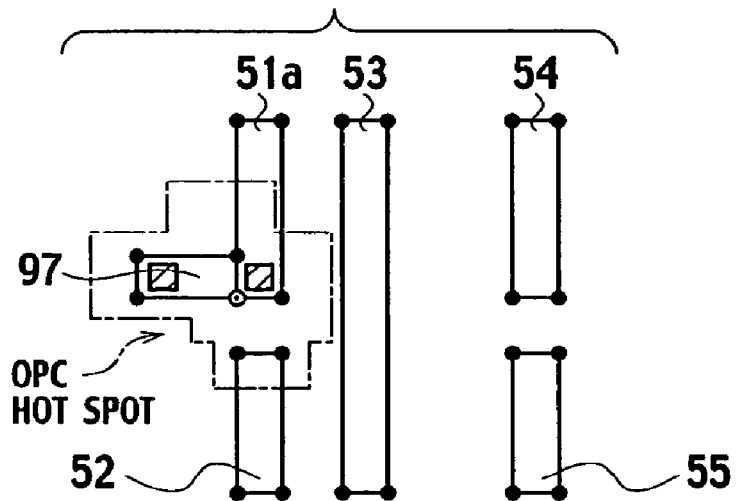
FIG. 54 is a layout example illustrating the method of providing multiple vias in the integrated circuit according to the second embodiment of the present invention.

In step S142d, the layout shown in FIG. 53 is subjected to the OPC verification. The mark module 261 shown in FIG. 3 reads the mark information stored in the verification information memory 15 and, as shown in FIG. 54, places the marks on vertices of the patterns 51a, 51b, 52, and 53 located around the pattern where the multiple via cell 97 is placed. When the additional marks are necessary, the mark module 261 reads the additional mark information stored in the verification information memory 15 and places the additional marks on sides of the patterns 51a, 52, and 53. The grouping module 262 of FIG. 3 reads the area information stored in the verification information memory 15 and groups adjacent marks to obtain a plurality of groups. Thereafter, the candidate hot spot judgment module 263 reads the candidate hot spot judgment information stored in the verification information memory 15 and extracts a candidate OPC hot spot as shown in FIG. 54.

Figure 55:
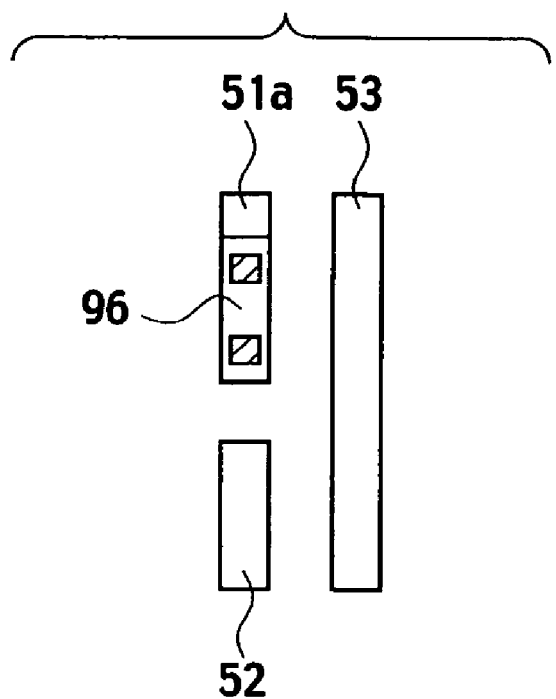
FIG. 55 is a layout example illustrating the method of providing multiple vias in the integrated circuit according to the second embodiment of the present invention.
Figure 56:
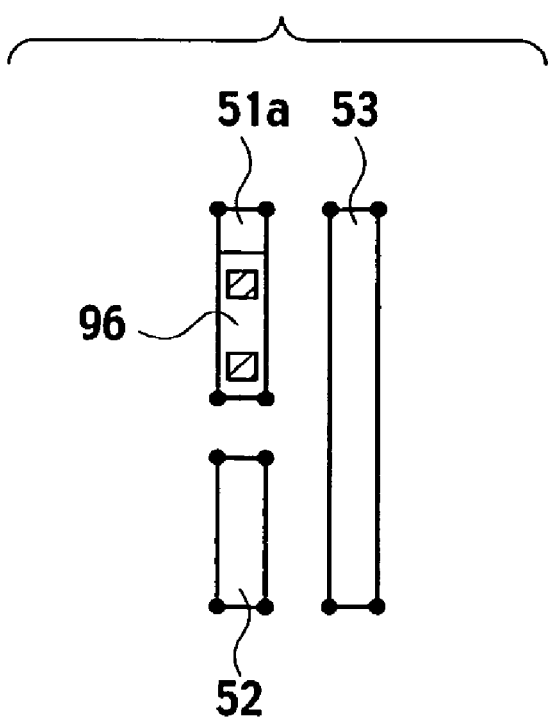
FIG. 56 is a layout example illustrating the method of providing multiple vias in the integrated circuit according to the second embodiment of the present invention.

In step 142e, the placement modification module 123 of FIG. 47 reads the information of the multiple via cell library 1422 and determines whether to replace the multiple via cell 97 with one of the different multiple via cells 96, 98, and 99. When the multiple via cell 97 is not replaced with the multiple via cell 96, 98, or 99, the operation is terminated. When the multiple via cell 97 is replaced with the different multiple via cell 96, 98, or 99, the procedure proceeds to step S142c. As shown in FIG. 55, the multiple via replacement module 122 then replaces the multiple via cell 97 with the different multiple via cell 96. The mark module 261 of FIG. 3 then places marks at the vertices of the patterns 51a, 52, and 53 as shown in FIG. 5.

Figure 57:
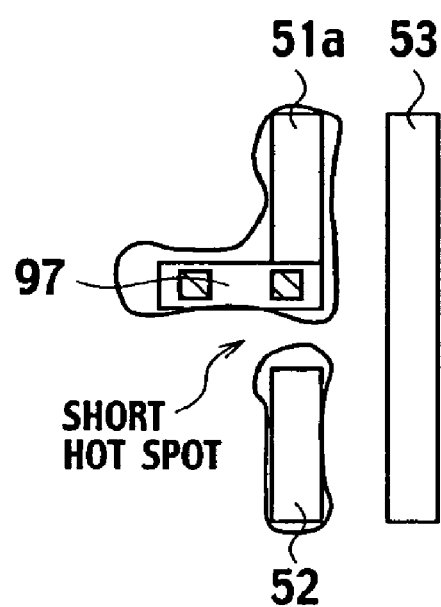
FIG. 57 is a layout example illustrating the method of providing multiple vias in the integrated circuit according to the second embodiment of the present invention.
Figure 58:
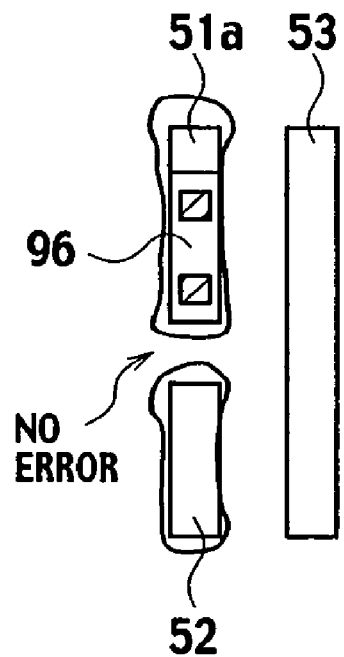
FIG. 58 is a layout example illustrating the method of providing multiple vias in the integrated circuit according to the second embodiment of the present invention.

With the design method of a semiconductor integrated circuit according to the second embodiment, when the multiple via cell 97 is placed as a via to connect wires, the vicinity of the patterns 51a, 52, and 53 around the multiple via cell 97 is searched for the candidate OPC hot spot. When the candidate hot spot is extracted, the multiple via cell 97 is replaced with the different via cell 96. As shown in FIG. 58, this prevents occurrence of a short hot spot or the like caused by the multiple via cell 97 being adjacent to the pattern 52 as shown in FIG. 57 even in the lithography rule check. It is therefore possible to design a semiconductor integrated circuit with higher yield.

Third Embodiment

—Computer Automated System—

Figure 59:
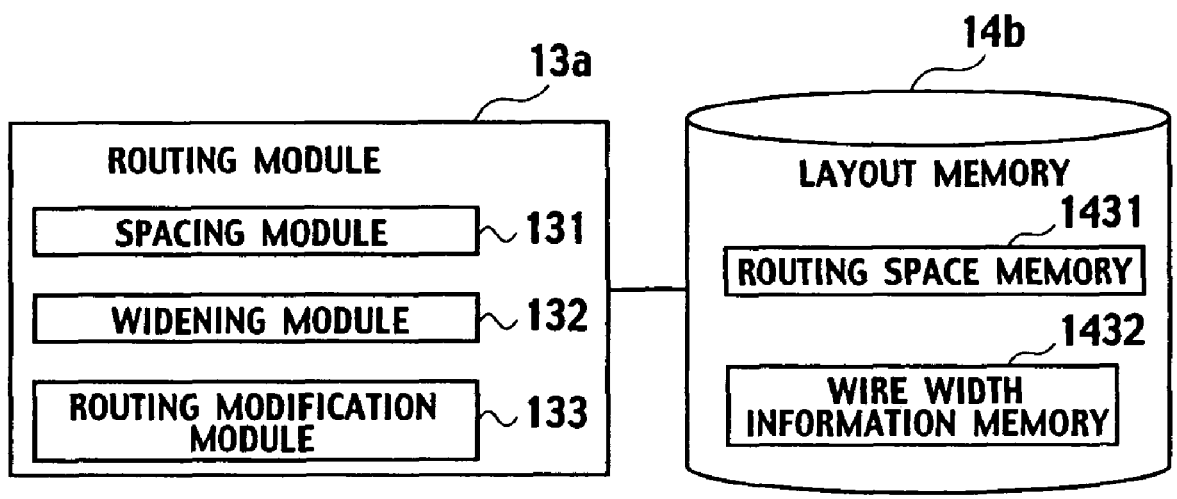
FIG. 59 is a block diagram illustrating an automated design system according to a third embodiment of the present invention.

As shown in FIG. 59, a design system according to a third embodiment includes a routing module 13a and a layout memory 14b. The routing module 13a includes a spacing module 131, a widening module 132, and a routing modification module 133. The layout memory 14b includes a routing space memory 1431 and a wire width information memory 1432.

Figure 63:
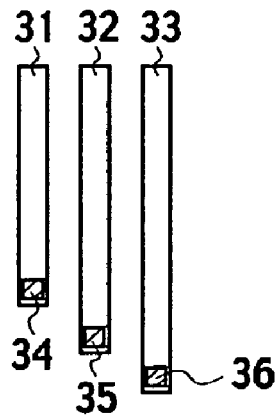
FIG. 63 is a layout example illustrating a method of providing multiple vias in the integrated circuit according to the third embodiment of the present invention.
Figure 64:
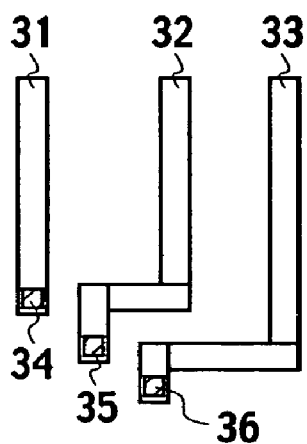
FIG. 64 is a layout example illustrating the method of providing multiple vias in the integrated circuit according to the third embodiment of the present invention.

The routing space memory 1431 stores information to expanding spacing between wires. For example, the critical area (an area including a short defect) of the random defect is used as an indicator. The routing space memory 1431 stores a rule to reduce the critical area. As shown in FIG. 63, when the patterns 31 to 33 having relatively small routing spaces are placed on the layout, the routing space memory 1431 stores information to increase the routing spaces between the patterns 31 to 33 by folding end portions of the patterns 31 to 33 as shown in FIG. 64.

Figures 60A, 60B:
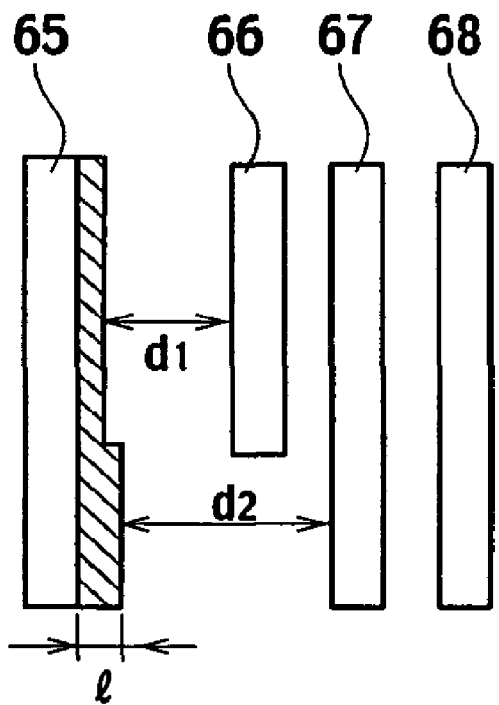
FIG. 60A is a layout example of wire widening information of the computer automated system for designing an integrated circuit according to the third embodiment of the present invention and illustrates a relationship between the distance of wire spaces and correction values.
FIG. 60B is a layout example of wire widening information of the computer automated system for designing an integrated circuit according to the third embodiment of the present invention and illustrates how to measure the wire space.

The wire width information memory 1432 of FIG. 59 stores information on parameters to increase the wire width according to the distance between adjacent wires as shown in FIGS. 60A and 60B. Examples of the stored width widening information are as shown in FIG. 60B: information to increase the wire width by 0.045 μm as a correction value 1 of a pattern 65 when a distance d1 between the pattern 65 and a pattern 66 is not less than 0.3 μm and less than 0.4 μm; information to widening the wire width by 0.060 μm as the correction value 1 when a distance d2 between the pattern 65 and a pattern 67 is not less than 0.6 μm.

The process to increasing the width of wires can be performed also for the purpose of securing a lithography margin. However, the third embodiment provides a system capable of executing the process to further increase the width of patterns of wires as the measure for random defects.

The spacing module 131 of FIG. 59 reads the routing space information of the routing space memory 1431. When the layout designed by the layout module 10 includes adjacent wires which could be problematic in design, the spacing between adjacent wires is increased. The widening module 132 reads the wire width information in the wire width information memory 1432 and increase the width of wires in the layout placed by the layout module 10. The other members are substantially the same as those of the design systems of a semiconductor integrated circuit according to the first and second embodiments.

—Computer Automated Method—

Figure 61:
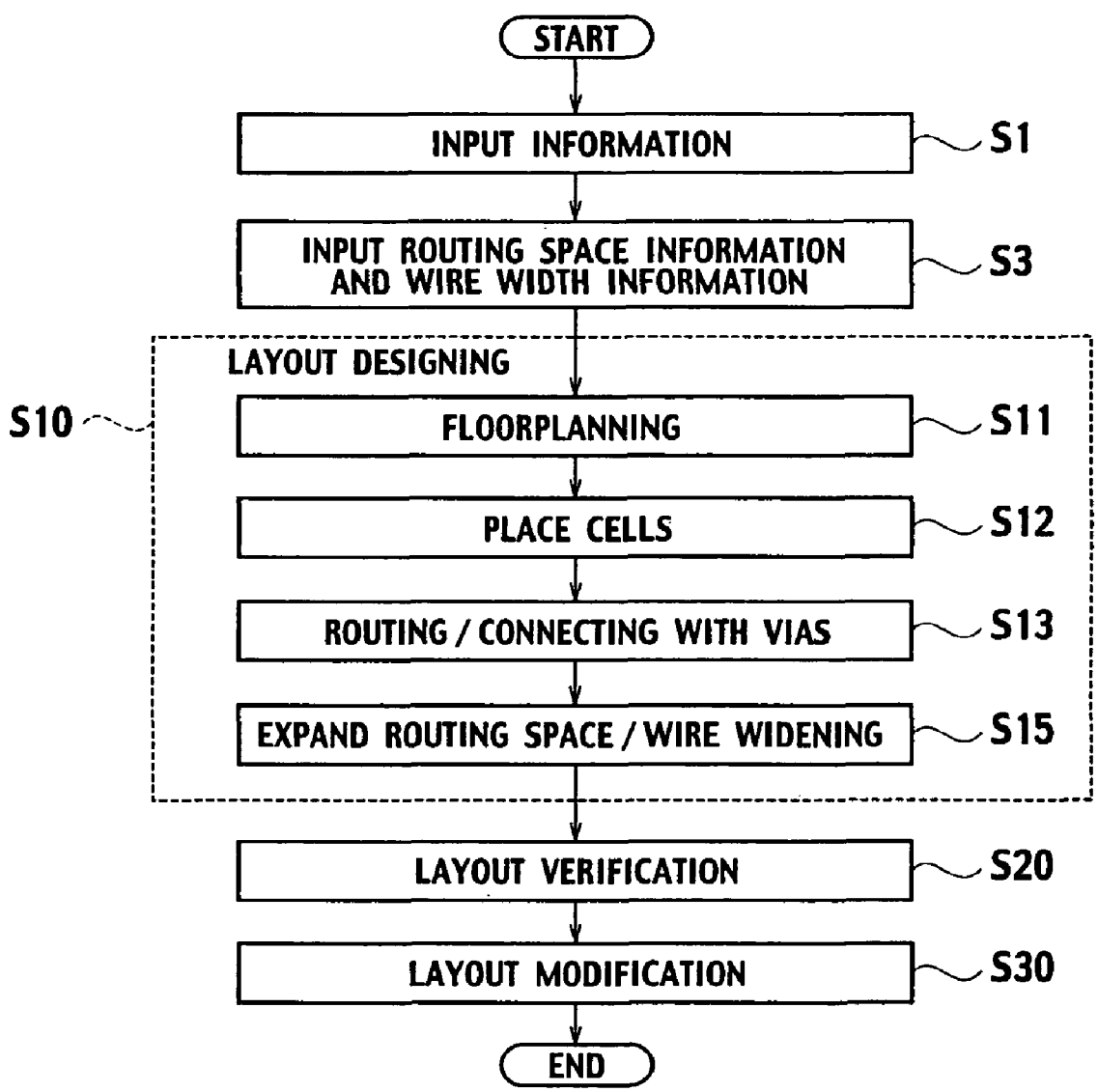
FIG. 61 is a flowchart illustrating a method of designing an integrated circuit according to the third embodiment of the present invention.
Figure 62:
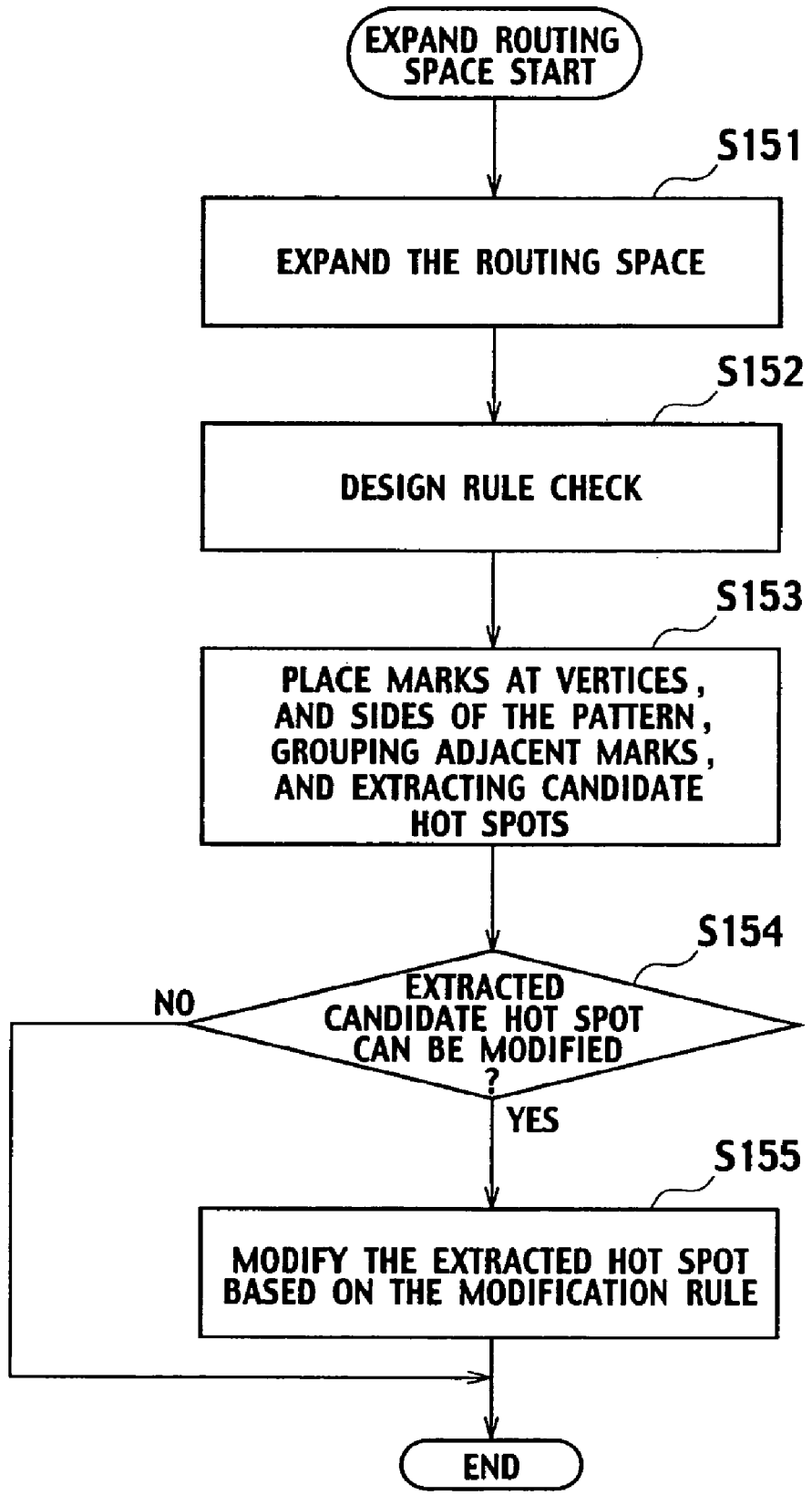
FIG. 62 is a flowchart illustrating a wire spreading method according to the third embodiment of the present invention.

A description is given of a computer automated method of designing a semiconductor integrated circuit according to the third embodiment using flowcharts of FIGS. 61 and 62.

In step S1 of FIG. 61, various types of information necessary for layout design, verification, and modification of a semiconductor integrated circuit are inputted into the design information memory 17 and program memory unit 6 of FIG. 1 through the input unit 4 of FIG. 1. In step S3, the routing space information and wire width information of wires placed in the chip area are inputted into the routing space memory 1431 and the wire width memory 1432 of FIG. 59 through the input unit 4.

In step S10, the layout module 10 reads the design information stored in the design information memory 17, the layout information stored in the layout memory 14, and the like and places cells, wires, vias, and the like in the chip area. In step S11, the floorplan module 11 reads the design information stored in the design information memory 17, creates a floorplan of the semiconductor integrated circuit, and then stores information on the floorplan in the layout memory 14. In step S12, the placement module 12 reads the information on the floorplan stored in the layout memory 14 and places logic and macro cells or high-yield cells in the chip area.

In step S13, the routing module 13 reads the floorplan stored in the layout memory 14. The routing module 13 routes wires and connect wires with vias and contacts in the chip area. In step S15, the routing module 13 reads the routing space information stored in the layout memory 14b of FIG. 59 and increases the routing space in the layout. The step S15 is described later in detail. In step S20, the layout designed in the step S10 is verified. In step S30, the layout modification module 30 reads the layout modification information stored in the layout modification memory unit 16 and judges hot spots of the layout and modifies the hot spot based on a transfer image of the layout.

—Detail of Method of Increasing Routing Space and Wire Width—

A description is given of a method of increasing the routing space and the wire width shown in the step S15 using a flowchart shown in FIG. 62.

In step S151 of FIG. 62, the routing spacing module 131 of FIG. 59 reads the placement information of the patterns 31 to 33 and vias 34 to 36 shown in FIG. 63 and the routing space information of the routing space memory 1431 and expands the routing space of the patterns 31 to 33. In step S152, the physical verification module 21 of FIG. 1 performs the DRC verification for the layout shown in FIG. 64 based on the verification information stored in the verification information memory 15 and modifies a pattern which could cause a fatal design problem.

Figure 65:
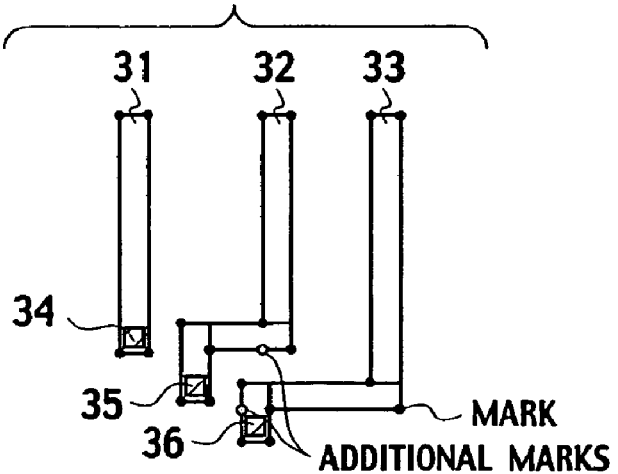
FIG. 65 is a layout example illustrating the method of providing multiple vias in the integrated circuit according to the third embodiment of the present invention.
Figure 66:
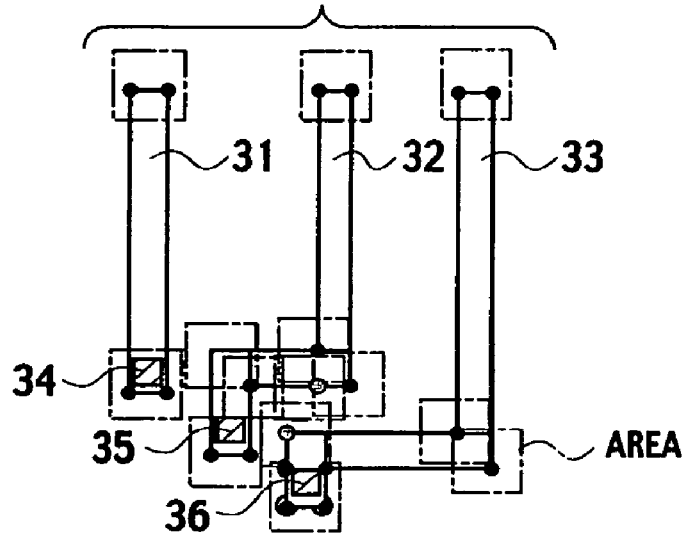
FIG. 66 is a layout example illustrating the method of providing multiple vias in the integrated circuit according to the third embodiment of the present invention.
Figure 67:
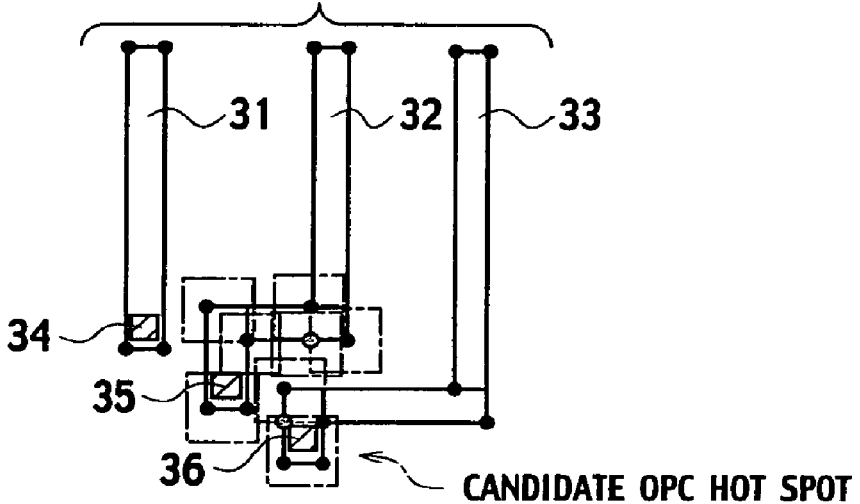
FIG. 67 is a layout example illustrating the method of providing multiple vias in the integrated circuit according to the third embodiment of the present invention.

In step S153, the layout is subjected to the OPC verification. The mark module 261 shown in FIG. 3 reads the mark information stored in the verification information memory 15 and places the marks at vertices of the patterns 31 to 33 around the region with the spacing between wires expanded as shown in FIG. 65. When the additional marks are necessary, the mark module 261 reads the additional mark information stored in the verification information memory 15 and places the additional marks at sides of the patterns 32 and 33. The grouping module 262 reads the area information stored in the verification information memory 15 and groups adjacent marks to obtain a plurality of groups. Thereafter, the candidate hot spot judgment module 263 reads the candidate hot spot judgment information stored in the verification information memory 15 and extracts a group to be the OPC hot spot (candidate hot spot) as shown in FIG. 67.

Figure 68:
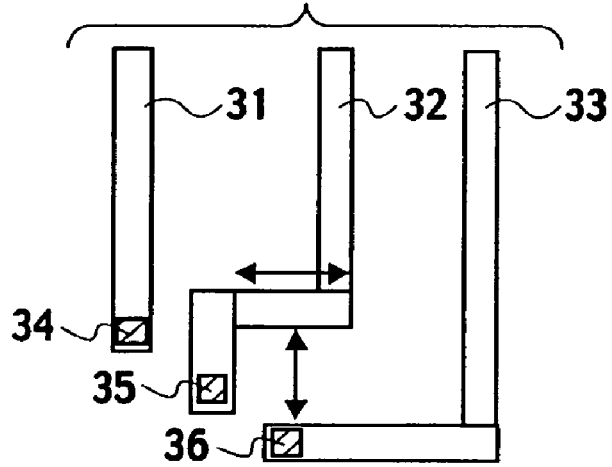
FIG. 68 is a layout example illustrating the method of providing multiple vias in the integrated circuit according to the third embodiment of the present invention.

In step S154, the candidate hot spot judgment module 263 judges whether the extracted hot spot can be modified based on the hot spot modification information stored in the verification information memory 15. When the modification is impossible, the operation is terminated. When the modification is possible, in step S155, the candidate hot spot judgment module 263 reads the candidate hot spot modification information stored in the verification information memory 15 and increases spacing between the patterns 31, 32, and 33 to modify the layout such that the number of marks included in the group extracted as the OPC hot spot is reduced as shown in FIG. 68.

Figure 69:
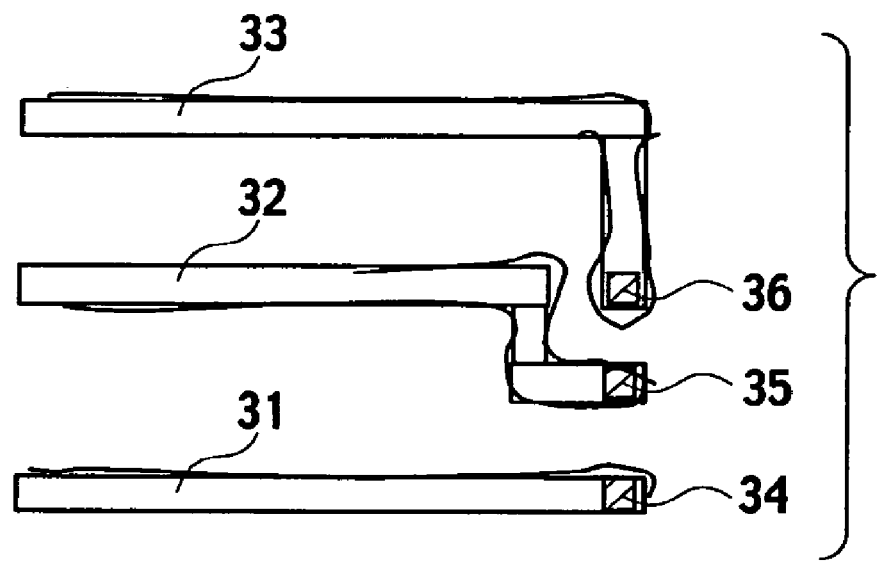
FIG. 69 is a layout example illustrating the method of providing multiple vias in the integrated circuit according to the third embodiment of the present invention.
Figure 70:
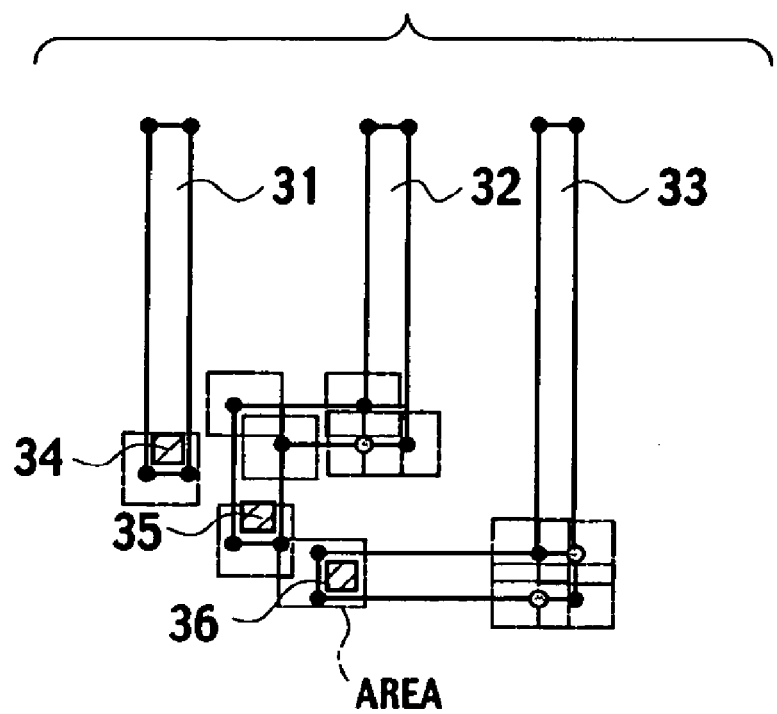
FIG. 70 is a layout example illustrating the method of providing multiple vias in the integrated circuit according to the third embodiment of the present invention.

With the method of designing a semiconductor integrated circuit according to the third embodiment, an area where the spacing between wires is comparatively small, in which the random defects are likely to occur, is subjected to the process to increase the routing space. This can prevent yield reduction due to the random defects and systematic defects. In the method of designing a semiconductor integrated circuit according to the third embodiment, increasing the spacing between wires as shown in FIG. 64 by folding the patterns 31 to 33 increases the probability of occurrence of the OPC hot spots (see FIG. 69). After the process to expand the spacing between wire patterns, therefore, the OPC hot spots are properly verified and modified as shown in the step S153 and FIGS. 65 to 68 to prevent the occurrence of the OPC hot spots as shown in FIG. 70. Accordingly, the lithography rule check and the check of the OPC problems can be carried out with high speed and high accuracy even after patterns of wires and the like in a wide area of the chip area are subjected to the measures for the random and systematic defects. It is therefore possible to provide the design method for a semiconductor integrated circuit capable of improving the yield.

Various modifications will become possible for those skilled in the art after receiving the teachings of the present disclosure without departing from the scope thereof.

What is claimed is:

1. A method of manufacturing an integrated circuit comprising:
   designing layout information including patterns of cells, wires, and vias to be placed on a semiconductor substrate implemented in a graphic image space of a chip area;
   verifying the layout information in the graphic image space by placing a plurality of marks on each of contours of the patterns, allocating selectively a plurality of discrete areas in a same level with the patterns on the marks taking account of an influence of the optical proximity effect of the patterns, merging adjacent discrete areas overlapping each other into a single polygon so as to define a plurality of isolated groups by the polygon, sorting the marks into the isolated groups so that the adjacent marks are merged in a same group, determining a candidate hot spot by counting a total number of the marks included in each of the isolated groups, extracting a group with the total number of the marks more than a predetermined value, and modifying a corresponding pattern in the candidate hot spot;

modifying the layout information by executing a lithography rule check;

producing a plurality of masks based on modified layout information;

forming an insulating film on the semiconductor substrate;

selectively etching a part of the insulating film by using one of the masks; and forming corresponding actual vias and corresponding actual wires, using the modified layout information, connected to the actual vias in the insulating film.

2. The method of claim 1, wherein designing the layout information includes placing patterns including logical cells, high-yield cells, wires, single vias, and multicut vias implemented in the graphic image space of the chip area.

3. The method of claim 1, wherein verifying the layout information further comprises placing an additional mark on one of the contours based on additional mark information before sorting the marks.

4. The method of claim 1, wherein each of the patterns are defined by a rectangular regions, and placing the marks includes:

placing the marks on respective vertices of each of the rectangular regions.

5. The method of claim 1, wherein modifying the layout includes:

separating adjacent patterns apart so that the total number of the marks in the candidate hot spot is reduced.

6. The method of claim 5, wherein designing the layout information includes placing patterns including one or more patterns of logical cells, high-yield cells, wires, single vias, and/or multicut vias implemented in the graphic image space of the chip area.

7. The method of claim 6, wherein modifying the layout includes separating the adjacent patterns apart so that a total number of marks in the candidate hot spot is reduced.

8. The method of claim 5, wherein verifying the layout information further comprises placing an additional mark on one of the contours based on additional mark information before sorting the marks.

9. The method of claim 5, wherein each of the patterns are defined by a rectangular regions, and placing the mark includes placing the marks on respective vertices of each of the rectangular regions.

10. The method of claim 5, wherein designing the layout information includes replacing the vias with multiple via cells based on information of a multiple via cell library.

11. The method of claim 5, wherein designing the layout information includes expanding a routing space of the wires based on routing space information.

12. The method of claim 5, wherein designing the layout information includes folding the wires and expanding a routing space of the wires.

13. The method of claim 1, wherein designing the layout information includes replacing the vias with multiple via cells based on information of a multiple via cell library.

14. The method of claim 13, wherein verifying the layout information includes placing the marks on contours of the multiple via cells.

15. The method of claim 1, wherein designing the layout information includes expanding a routing space of the wires based on routing space information.

16. The method of claim 15, wherein verifying the layout information includes placing the marks on contours of wires after the routing space is expanded.

17. The method of claim 1, wherein designing the layout information includes folding the wires and expanding a routing space of the wires.

18. The method of claim 17, wherein verifying the layout information includes placing the marks on contours of the wires after the routing space is expanded.

19. The method of claim 1, wherein verifying the layout information further comprises allocating a plurality of areas on the marks taking account of an influence of an optical proximity effect before dividing the marks.

20. The method of claim 19, wherein verifying the layout information further comprises merging adjacent areas overlapping each other into a single polygon.

* * * * *